United States Patent
Sojak et al.

(10) Patent No.: US 8,701,288 B2
(45) Date of Patent: Apr. 22, 2014

(54) APPARATUS AND METHOD FOR FORMING AN ANTIPOLLUTION DEVICE HOUSING

(75) Inventors: Richard Sojak, Wardsville (CA); Clifford Bailey, Wardsville (CA); James Ramandt, Newbury (CA); Guy Devine, Bothwell (CA)

(73) Assignee: GWS Tube Forming Solutions Inc., Bothwell, Ontario (CA)

( * ) Notice: Subject to any disclaimer, the term of this patent is extended or adjusted under 35 U.S.C. 154(b) by 774 days.

(21) Appl. No.: 12/741,950

(22) PCT Filed: Nov. 10, 2008

(86) PCT No.: PCT/CA2008/001976
§ 371 (c)(1),
(2), (4) Date: Aug. 10, 2010

(87) PCT Pub. No.: WO2009/059427
PCT Pub. Date: May 14, 2009

(65) Prior Publication Data
US 2010/0293950 A1    Nov. 25, 2010

Related U.S. Application Data

(60) Provisional application No. 60/986,837, filed on Nov. 9, 2007.

(51) Int. Cl.
*B21D 51/16* (2006.01)
(52) U.S. Cl.
USPC ............................................... 29/890; 72/85
(58) Field of Classification Search
USPC ........... 29/890; 422/179; 72/84, 85; 425/293, 425/292
See application file for complete search history.

(56) References Cited

U.S. PATENT DOCUMENTS

| | | | | |
|---|---|---|---|---|
| 3,677,684 A | * | 7/1972 | Platz | 425/393 |
| 4,021,180 A | * | 5/1977 | Smith | 425/392 |
| 4,143,535 A | * | 3/1979 | Bouman | 72/119 |
| 4,738,013 A | * | 4/1988 | Yamashita et al. | 29/890 |
| 4,894,987 A | | 1/1990 | Harwood et al. | |
| 5,118,476 A | | 6/1992 | Dryer et al. | |
| 5,724,735 A | | 3/1998 | Ickes et al. | |
| 5,758,532 A | * | 6/1998 | Massee | 72/83 |
| 5,899,104 A | * | 5/1999 | Brilman et al. | 72/58 |
| 6,010,668 A | | 1/2000 | Lawrence et al. | |
| 6,185,819 B1 | | 2/2001 | Bauer et al. | |
| 6,253,792 B1 | | 7/2001 | Williams et al. | |
| 6,293,010 B1 | * | 9/2001 | Umin et al. | 29/890 |
| 6,381,843 B1 | * | 5/2002 | Irie et al. | 29/890 |
| 6,389,693 B1 | | 5/2002 | Aranda et al. | |
| 6,438,839 B1 | | 8/2002 | Hardesty et al. | |
| 6,491,878 B1 | | 12/2002 | Locker et al. | |
| 6,591,497 B2 | | 7/2003 | Foster et al. | |
| 6,591,498 B2 | * | 7/2003 | Irie et al. | 29/890 |

(Continued)

*Primary Examiner* — David Bryant
*Assistant Examiner* — Jacob Cigna

(57) ABSTRACT

An apparatus and a method for manufacturing a housing of an antipollution device including one or more bricks supported by one or more mats therein. One or more main portions are formed, the main portion of the housing defining a formed chamber in which the brick(s) compress the mat(s) between the brick(s) and the main portion to a predetermined density. One or more end portions are formed, for connection of the antipollution device in an exhaust system. When one or more transition portions are formed to connect the main portion(s) and the end portion(s), the main portion(s) is engaged by the apparatus to resist deformation of the formed chamber.

6 Claims, 27 Drawing Sheets

(56) References Cited

U.S. PATENT DOCUMENTS

| | | |
|---|---|---|
| 6,701,617 B2 | 3/2004 | Li et al. |
| 6,737,027 B1 | 5/2004 | Myers |
| 6,769,281 B2 * | 8/2004 | Irie et al. ............ 72/121 |
| 7,013,690 B2 * | 3/2006 | Massee ............ 72/84 |
| 7,033,412 B2 | 4/2006 | Kumar et al. |
| 7,174,634 B2 | 2/2007 | Morikawa et al. |
| 7,219,520 B2 * | 5/2007 | Massee ............ 72/83 |
| 7,316,142 B2 | 1/2008 | Lancaster |
| 2006/0123864 A1 * | 6/2006 | Massee ............ 72/84 |
| 2006/0272153 A1 | 12/2006 | Bowman et al. |
| 2007/0033804 A1 | 2/2007 | Morikawa et al. |

* cited by examiner

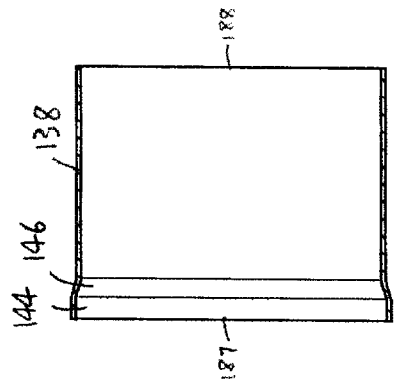
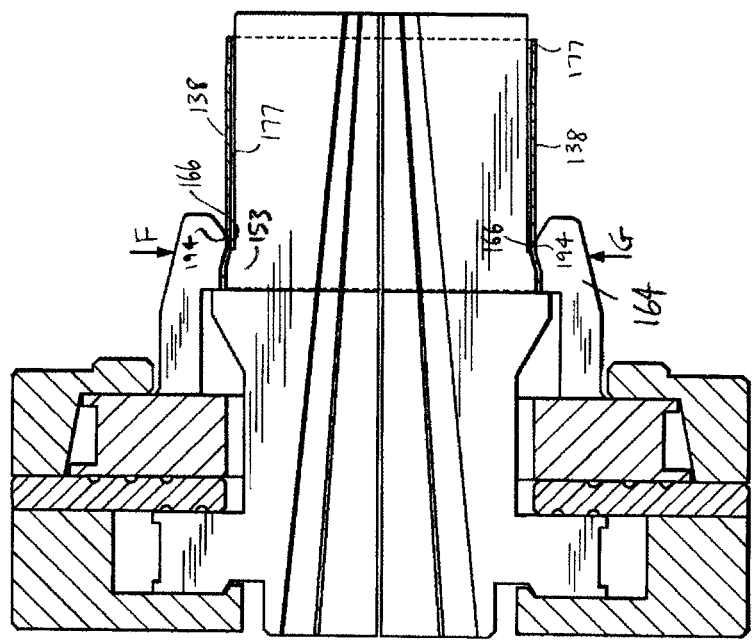
FIG. 5A
FIG. 5B

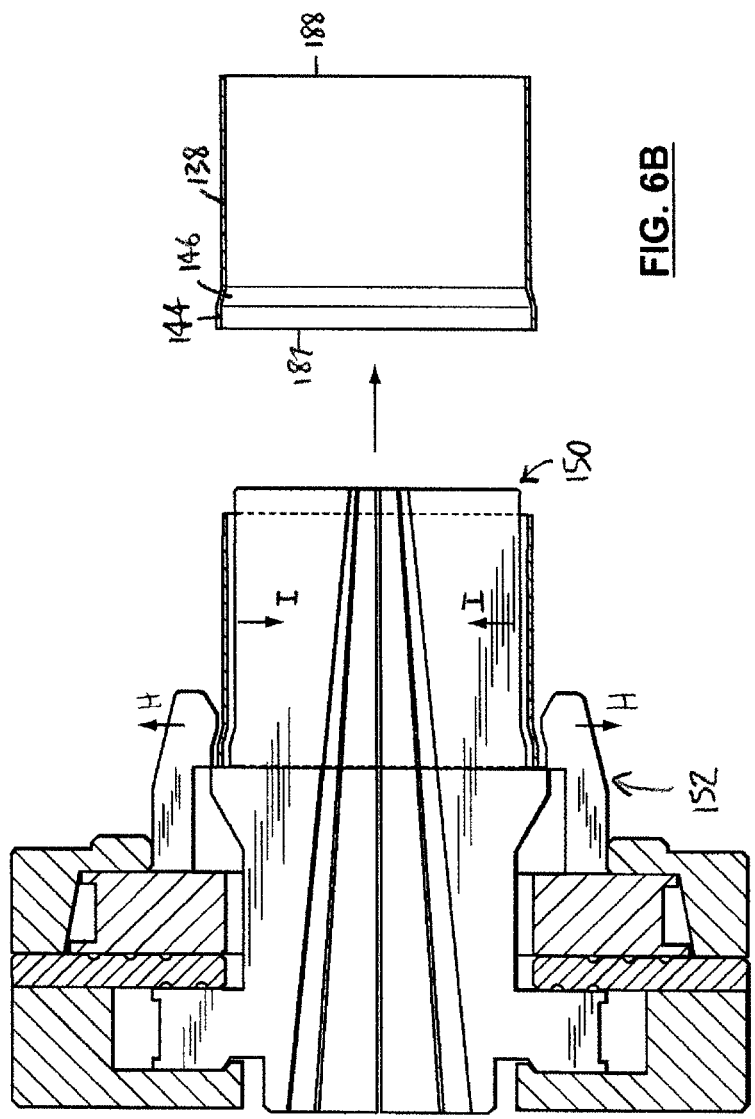

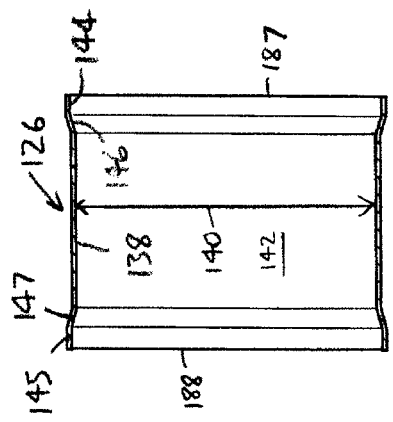
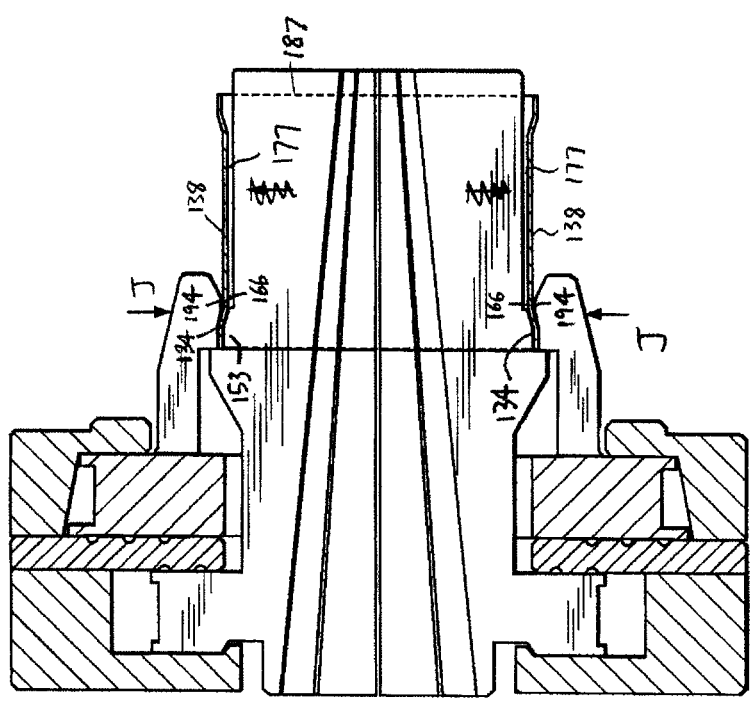
FIG. 8B
FIG. 8A

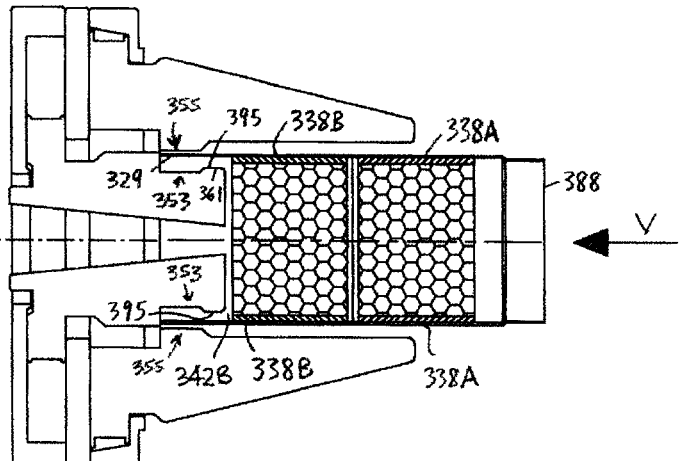
FIG. 12I
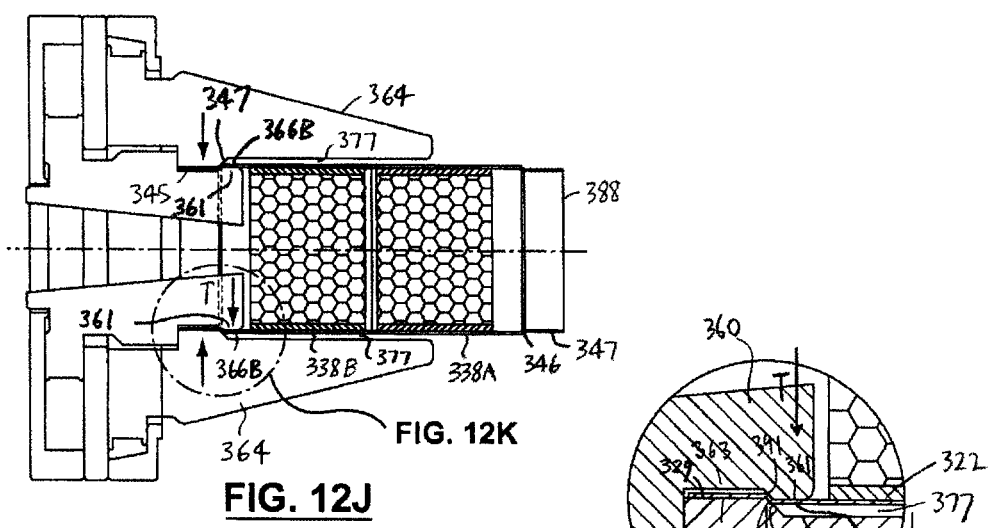
FIG. 12J
FIG. 12K
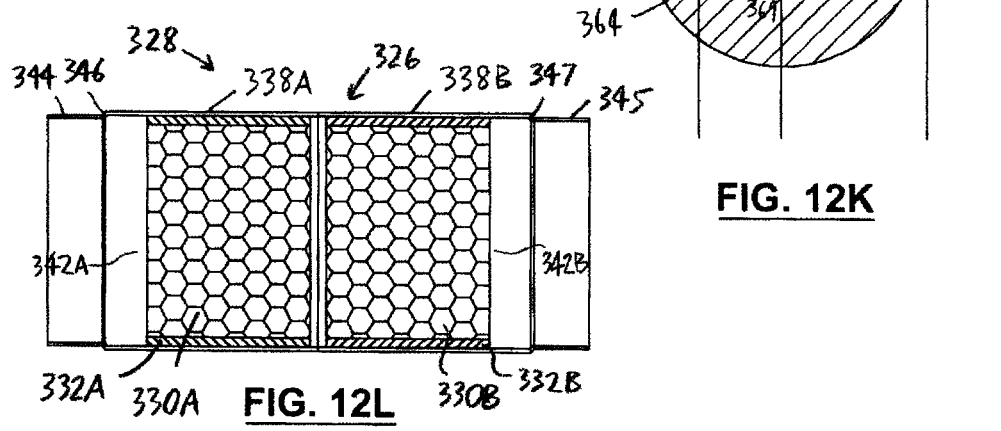
FIG. 12L

APPARATUS AND METHOD FOR FORMING AN ANTIPOLLUTION DEVICE HOUSING

FIELD OF THE INVENTION

This invention is related to an apparatus and a method for forming an antipollution device housing.

BACKGROUND OF THE INVENTION

Various antipollution devices adapted to be included in automotive exhaust systems are known. Two common examples are the catalytic converter and the diesel particulate filter ("DPF"). Such known antipollution devices typically include housings in which certain components are positioned. In the prior art, manufacturing the housings of these antipollution devices usually involves time-consuming (and therefore relatively costly) steps taken to address certain problems.

Catalytic converters are used for processing exhaust gases from a spark ignition engine powered by a fuel (e.g., gasoline, liquified petroleum gas, various blends of E85 and gasoline, and compressed natural gas) and from compression ignition (diesel) engines, to reduce or eliminate certain harmful gases (i.e., pollutants) in the exhaust gases. In general, the catalytic converter includes a catalyst which chemically converts certain gaseous pollutants in the exhaust to harmless compounds.

DPFs address a different pollutant. Diesel engines also produce a large volume of particulate (i.e., soot) which is also extremely detrimental to the environment. (For the purposes hereof, "exhaust" will be understood to include exhaust gases and any particulate therein.) An exhaust system including a DPF releases less soot into the environment. However, the typical DPF is very similar in construction to, and uses components similar to those used in, a catalytic converter, so that similar if not identical manufacturing methods typically are used in manufacturing the DPF and the catalytic converter.

A typical prior art antipollution device 28 is shown in FIG. 1A. (As will be described, the remainder of the drawings illustrate the present invention.) As can be seen in FIG. 1A, the prior art antipollution device 28 has a housing 26 including three portions: a main portion 38, end portions 44, 45 at each end of the housing 26, and transition portions 46, 47 connecting each end portion 44, 45 to the main portion 38 respectively. Typically, the end portions 44, 45 are sized for mating with other elements in the exhaust system, e.g., end cones "X" and "Y", as shown in FIG. 1A. It will be understood that, in FIG. 1A, part of the housing in the main portion 38 is not shown for clarity of illustration, so that the brick 30 and the mat 32 may be shown.

It will also be understood that the prior art housing shown in FIG. 1A is exemplary only. Many different variations are well known in the art. For example, a "maniverter" (not shown) is a type of antipollution device which is mounted at or very close to a manifold on an engine, and the end portions thereof are formed accordingly. Other antipollution devices are positioned elsewhere in the exhaust system, for example, contained within a baffle subassembly (not shown) on the downstream side of the device, i.e., rather than an end cone. Accordingly, and as is also well known in the art, the housing may not necessarily be symmetric, e.g., the housing may include only one sized end portion. Similarly, because of the performance requirements and system constraints, the housing's main portion may not be symmetric with respect to its center. Also, the end portion(s) may be raised with respect to the main portion (as shown in FIG. 1A) or, alternatively, recessed relative to the main portion.

Within the main portion of the housing of a typical antipollution device is assembled a honeycomb-like structure (i.e., a "brick") 30 most commonly made of a suitable ceramic substrate or similar material. (Other materials, e.g., stainless steel honeycombs, are also sometimes used as the substrate.) The brick 30 provides a structure to which are applied various precious metals which act as the catalyst. The brick 30 is a very fragile structure and is easily damaged, and because of this it is usually wrapped in the supportive mat 32 inside the main portion 38 of the housing 26. As is well known in the art, typically the main portion 38 of the housing 26 is sized to accommodate the preselected brick 30 and the preselected mat 32 therein.

The mat 32 is usually critical to the overall performance of the antipollution device. The mat 32 is required to seal the surfaces between the outer perimeter of the brick 30 and the inner perimeter of the housing 26 (i.e., in the main portion 38) to ensure that substantially all exhaust passes through the brick 30 and thus is exposed to the catalyst, so that the undesired emissions are processed. In addition, the mat 32 also imparts the proper forces within the housing 26 to ensure the brick 30 is not fractured due to excessive force, but is subjected to sufficient force to properly maintain and hold the brick 30 in the desired position within the housing 26 without slippage.

As is well known in the art, housings for antipollution devices are provided in a variety of shapes in cross-section. For example, in cross-section, the housings may have the following shapes: round, ovals, rectangles, squares, trapezoids, and many variations of such shapes, including irregular configurations. It is also known that antipollution device housings are often designed to receive a single brick, but alternatively housings are also often made with several bricks because of the performance requirements.

A wide variety of procedures for manufacturing antipollution devices are known in the prior art. For instance, it is known to provide a housing which is somewhat larger than required for a particular brick/mat subassembly 33. In this situation, the housing 26 is reduced in size, to the required size and shape for the individual brick/mat subassembly 33. It is also known in the prior art to provide a housing which is required to be expanded in order to accommodate the brick/mat subassembly 33.

A number of problems have arisen in connection with the known methods of manufacturing antipollution devices. The methods of the prior art have resulted in many failures due to inaccurate forming of the main portion 38, the end portion 44, 45, and the transition portions 46,47 in relation to the dimensions of the specific mat and the brick(s) which are assembled within the particular housing. For instance, if the housing is incorrectly formed too large, then the brick/mat subassembly 33 slides in relation to the housing 26, resulting in damage to the brick 30 and/or mat 32 and, as a direct consequence, the immediate failure of the antipollution device when it is used. On the other hand, if the housing 26 is sized too small or too tight, the antipollution device either cannot be assembled or the brick/mat subassembly 33 is damaged during the assembly process, which typically results in impaired performance or failure of the antipollution device.

As noted above, the end portions 44, 45 are required to be formed to be connected to other elements in the exhaust system. For a particular antipollution device housing (i.e., designed to be included in a particular exhaust system), therefore, the dimensions of the end portions 44, 45 are not subject to change—they are consistent for that housing, regardless of small variations in individual bricks and mats. However, the transition portions are, ideally, different in each housing, because the transition portions 46, 47 connect the main portion 38 (the dimensions of which are different because they are tailored to each individual brick and mat) to the end portions 44, 45 (the dimensions of which are substantially constant for a particular housing design).

It is further known that the transition portions 46, 47 of the housing 26 are also critical to ensuring optimum performance and longevity of the antipollution device. For example, if the transition portion(s) is too long (i.e., the transition portion(s) blend into the main portion), the mat 32 does not impart sufficient force evenly distributed throughout the main portion 38 to ensure retention of the internal components, i.e., the brick(s).

If a transition portion is too abrupt (i.e., too steep), depending on the circumstances, such too short transition portion may cause different problems. For example, when forming an empty housing and stuffing the brick/mat subassembly therein afterwards, if the transition portion is too steep, the mat 32 does not stay in position relative to the brick 30, and/or the edges of the mat 32 are damaged. Also, as another example, where a previously stuffed housing is reduced to GBD (described below) and the end portions are then further reduced to a smaller size, the transition portion will become too steep and natural material flow may result in the inner wall surface of the housing touching and potentially chipping (breaking) the edges of the brick, if the transition portion is not supported during forming. This happens in these circumstances because the inner diameter of the housing (i.e., in the main portion) should be supported to ensure adequate clearance between the brick and inner wall surface during the forming (reduction) of the end portions and the transition portions.

It is well known in the art that, to improve the performance of antipollution devices, each housing should be formed specifically to an individual size, shape, and form that is precisely tailored for each individual brick and mat. Also, for the reasons set out above, the transition portions of the housing need to be tailored for the individual brick and mat in order to provide antipollution devices which function properly. To accomplish this and properly size or form the housing 26, the individual and/or combined dimensions of each specific internal component are required.

Many methods are well known in the art for determining the features or dimensions of and other data related to the individual internal components or the brick/mat subassembly 33.

For example, the features of each individual brick can easily be measured from which can be derived maximum or minimum diameters or cross-sections as well as the perimeter of the brick. Diameters and perimeters are normally calculated for round bricks while cross-sections and perimeters are calculated for non-round bricks. Several known measuring processes are used to calculate these values ranging from simple mechanical measuring devices such as vernier calipers or micrometers to gauges or fixtures specifically designed to measure the brick. Typically, such devices provide data related to dimensions, weights and densities electronically, i.e., in a format readily transferred to, and useable by, other devices. Cameras and lasers and other non-contact devices are also commonly used to measure the dimensional characteristics of the brick 30 which also easily electronically report the dimensional characteristics of the part being measured. In some instances, this data has been predetermined to expedite processing of the workpiece and is provided in the form of a barcode label attached directly to or transferred with the brick 30 where it can easily be accessed.

Similarly, a number of methods for determining the relevant characteristics of each individual mat 32 are well known in the art. Common methods include using simple mechanical measuring devices such as vernier calipers or micrometers to gages or fixtures specifically designed to measure the mat 32. Other practices may use force calculating devices to determine the density of the mat material. In most instances these devices can electronically report the features or dimensional findings acquired. In some instances, this data has been predetermined and is provided in the form of a barcode label attached directly to or transferred with the mat 32 where it can easily be accessed.

Additionally it is known to preassemble the brick 30 and the mat 32 (i.e., to form a brick/mat subassembly 33) and determine the relevant overall individual brick/mat subassembly characteristics. This can be accomplished using any of the measurement methods typically used to measure the individual components as described previously. Diameters and perimeters are normally calculated for round subassemblies while cross-sections and perimeters are calculated for non-round subassemblies. The dimensional features or characteristics of the subassembly can also be calculated by recording force imparted on the subassembly at known positions to determine the optimum size required for the housing. In some instances, this data has been predetermined and provided in the form of a barcode label attached directly to or transferred with the brick/mat subassembly 33 where it can easily be accessed.

Since the performance of the assembled antipollution device depends largely on correct sizing in the main portions of the housing, where the brick/mat subassembly 33 is positioned or contained, each housing 26 is sized to a particular size (and shape) based on the components that are assembled within the housing. As noted above, however, there is no prior art method or apparatus for properly forming the main portion and the end portions, and the transition portions relative to the formed main portion.

A number of methods of inspecting the completed antipollution device or housing (i.e., with the brick 30 and mat 32 positioned in the housing 26, or prior to assembling the brick 30 and mat 32 within the housing 26), to determine acceptability of the completed device, are known. For example, one common method is to measure the completed housing and calculate the Gap Bulk Density (GBD). Another inspection method involves monitoring the amount of force that is required to push the brick/mat subassembly 33 into or out of a properly sized housing. Various other inspection methods are known. Regardless of the method, successful validation of completed assembly relies on the main portion 38 of the housing 26 having the proper size and shape relative to the size and features of the individual internal components, i.e., the specific individual brick(s) 30 and the specific individual mat 32.

Various methods of assembling the brick and the mat in the housing are known in the art. For example, one of the prior art methods is the "hard stuffed" method, in which the housing is previously formed to accommodate a selected brick 30 and a selected mat 32, and then the particular brick/mat subassembly and the particular mat for which the housing was formed are "stuffed" into the housing. This method of forming typically requires a smaller housing to be expanded to the dimensions required to accommodate the brick/mat subassembly 33.

An alternative prior art method involves stuffing the brick/mat subassembly 33 loosely into a housing that is larger than required, then to reduce the housing to the size that is required to accommodate the brick/mat subassembly 33.

If the housing is properly formed to the correct dimensions of the individual brick/mat assembly, then the assembled antipollution device satisfies the necessary GBD and/or other required inspection criteria. However, because the tolerance is relatively fine, even a small deviation from the required dimensions of the housing can result in an unacceptable assembly.

Accordingly, because the prior art method of making the antipollution device can easily result in an unacceptable assembly, significant efforts are made in the prior art to form each housing with the correct dimensions for each individual brick/mat subassembly, resulting in significant manufacturing costs. In particular, forming a housing in which the main portion, the end portions, and the transition portions are all properly formed for the individual brick(s) and mat is only possible if more than one prior art machine is used. For instance, in the prior art, the housing is often formed in a process in which at least two, and sometimes three or more different machine heads are used in an attempt to ensure that each housing is appropriately formed for a specific brick and a specific mat. Using this many machines involves a relatively high unit expense and also requires time to be spent in the manufacturing process moving the workpiece between machines. Furthermore, known methods of forming the transition portion result in the transition portion being formed based on an approximation of the dimensions of the main portion (i.e., and the dimensions of the formed chamber). Because such methods are based on approximations, however, the transition portions frequently are improperly formed, resulting in housings rejected due to failure to meet quality control standards or early failure of antipollution devices including the housings formed using such methods.

SUMMARY OF THE INVENTION

For the reasons set out above, there is a need for an improved apparatus and method for making housings for antipollution devices which address or mitigate one or more of the defects of the prior art.

In its broad aspect, the invention provides an apparatus for forming a workpiece with an inner surface and an opposed outer surface into a housing of an antipollution device for treating exhaust in which one or more preselected catalyst-bearing bricks are positionable, and in which one or more mats are positionable between the brick(s) and the housing to support the brick(s). At least part of the inner surface defines an initial chamber in the workpiece with one or more initial dimensions. The apparatus includes a first set of members for engaging the inner surface and a second set of members for engaging the outer surface. The apparatus also includes a controller adapted to receive dimensional data for the brick(s) and the mat(s) and, based on the dimensional data, to determine one or more calculated dimensions at least partially defining a formed chamber in a main portion of the housing. The calculated dimension(s) is sized for compressing the mat to the preselected density when brick(s) is positioned in the formed chamber and when mat(s) is positioned between the brick(s) and the housing. Also, the controller is adapted to control a selected one of the first and second sets of members for engaging the workpiece to change the initial dimension(s) to the calculated dimension(s), for compressing the mat(s) to the preselected density when the brick(s) and the mat(s) are positioned in the formed chamber of the housing. The controller is additionally adapted for controlling the first and second sets of members to form one or more end portions of the housing with at least one preselected dimension thereof having a predetermined relation to the calculated dimension(s). In addition, the controller is adapted for controlling the first and second sets of members to form at least one transition portion of the housing connecting an end portion with the main portion of the housing substantially without deformation of the formed chamber.

In another aspect, the other of the first and second sets of members is adapted to engage at least a part of the main portion while an end portion and a transition portion connecting the end portion and the main portion are formed, to resist deformation of the main portion.

In yet another aspect, the first set of members comprises an end sizing element adapted to cooperate with an engagement section of the second set of members to form a workpiece end part into an end portion and a transition portion connecting the end portion to the main portion.

In another aspect, the other of the first and second sets of members comprises an outer surface adapted to engage a preselected proximal part of the main portion when the transition portion is formed, for resisting deforming of the main portion.

In yet another of its aspects, the invention provides a method of manufacturing an antipollution device with a housing having a formed chamber in which one or more catalyst-bearing bricks are supported by one or more mats. The method includes, first, providing dimensional data for the brick(s) and the mat(s), and second, providing a workpiece with an inner surface and an opposed outer surface thereof, at least part of the inner surface defining an initial chamber with one or more initial dimensions. Next, one or more calculated dimensions of the main portion of the housing based on the dimensional data is calculated. The calculated dimensions at least partially defining the formed chamber so that the mat is compressed between the brick(s) and the housing to a preselected density when the brick(s) and the mat(s) are positioned in the formed chamber within the main portion. In the next step, a selected one of first and second sets of members is engaged with the workpiece to change the initial dimension(s) to the calculated dimension(s). Then, an end portion of the housing is formed with one or more preselected dimensions thereof having predetermined relations to the dimension(s). Next, a transition portion connecting the end portion with the main portion of the housing is formed substantially simultaneously, at least a part of the main portion proximal to the transition portion is engaged with the other of said first and second sets of members, for resisting deformation of the formed chamber.

In yet another aspect, the invention provides a housing produced according to the method of the invention.

In another of its aspects, the invention provides an antipollution device including a housing produced according to the method of the invention.

BRIEF DESCRIPTION OF THE DRAWINGS

The invention will be better understood with reference to the attached drawings, in which:

FIG. 5A is a cross-section of the machine head subassembly of FIG. 2A in which the workpiece is positioned thereon in a fourth step of an embodiment of the method of the invention, drawn at a smaller scale;

FIG. 5B is a cross-section of the workpiece of FIG. 5A;

FIG. 6A is a cross-section of the machine head subassembly of FIG. 2A in which the workpiece is positioned thereon in a fifth step of an embodiment of the method of the invention;

FIG. 6B is a cross-section of the workpiece of FIG. 6A;

FIG. 8A is a cross-section of the machine head subassembly of FIG. 2A in which the housing is positioned thereon in a seventh step of an embodiment of the method of the invention;

FIG. 8B is a longitudinal cross-section of the housing of FIG. 8A showing the formed chamber in the main portion thereof;

FIG. 12I is a cross-section of the machine head subassembly of FIG. 12A in which the workpiece is positioned thereon in a eighth step of the method of the invention;

FIG. 12J is a cross-section of the machine head subassembly of FIG. 12 in which the workpiece is positioned thereon in a ninth step of the method of the invention;

FIG. 12K is a cross-section of a portion of the machine head subassembly of FIG. 12J and a portion of the workpiece, drawn at a larger scale;

FIG. 12L is a partial cross-section of an embodiment of an antipollution device of the invention, drawn at a smaller scale;

DETAILED DESCRIPTION

Figure 1A:
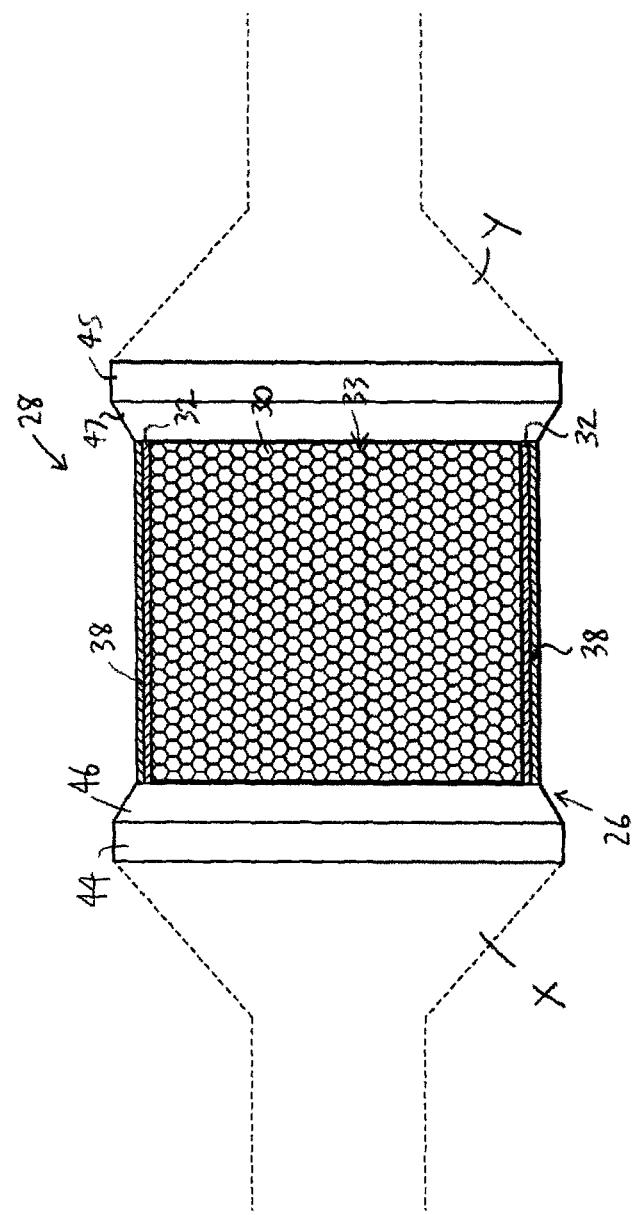
FIG. 1A (also described previously) is a side view of a housing of an antipollution device of the prior art, with a partial cross-section showing a brick and a mat positioned therein.

To simplify the description, the numerals used previously in describing FIG. 1A will be used again, except that each such numeral is raised by 100 (or multiples thereof, as the case may be), where the parts described correspond to parts already described.

Reference is first made to FIGS. 1B-8B to describe an embodiment of an apparatus 120 of the invention. The apparatus 120 (FIG. 1B) is for forming a workpiece 122 with one or more inner surfaces 124 and an opposed outer surface 125 into a hollow housing 126 (FIG. 1D) of an antipollution device 128 for treating exhaust in which one or more preselected catalyst-bearing bricks 130 is positionable, and in which one or more mats 132 are also positionable between the brick 132 and the housing 126 to support the brick 132 (FIG. 1C). At least part 127 of the inner surface 124 defines an initial chamber 136 in the workpiece 122 with an initial dimension 137 (FIG. 2A). (For clarity of illustration, the workpiece is illustrated twice in FIG. 2A, i.e., in dashed lines and identified with reference numeral 122A, and on the apparatus.) In one embodiment, the apparatus 120 preferably includes a first set of members 150 for engaging the inner surface 124 and a second set of members 152 for engaging the outer surface 125, as will be described. In addition, the apparatus 120 also preferably includes a controller 154 (FIG. 1E) adapted to receive dimensional data 156 for the brick 130 and the mat 132 and, based on the dimensional data 156, to determine one or more calculated dimensions 140 at least partially defining a formed chamber 142 in a main portion 138 of the housing 126 (FIG. 8B). The calculated dimension 140 is sized for compressing the mat 132 to the preselected density when the brick 130 is positioned in the formed chamber 142 and the mat 132 is positioned between the brick 130 and the housing 126. Also, the controller 154 preferably is additionally adapted to control a selected one of the first and second sets of members 150, 152 for engaging the workpiece 122 to change the initial dimension 137 to the calculated dimension 140, for compressing the mat 132 to the preselected density when the brick 130 and the mat 132 are positioned in the formed chamber 142 of the housing 126.

The brick 130 is a catalyst-bearing brick for treating exhaust, as described above. The brick 130 may be adapted for treating exhaust gases, and/or it may be adapted for treating particulate which is included in the exhaust. Although references in this description generally are to "the" brick 130, it will be understood that the description herein is also equally applicable to antipollution devices which include two or more bricks, as will be described. Also, although references generally are to "the" mat, it will be understood that the description herein is equally applicable to antipollution devices which include two or more mats. Forming such antipollution devices using the apparatus and method of the invention are also described further below.

As is known (and as described above), measurements of bricks and mats (herein collectively referred to as "dimensional data" 156) may be obtained in a number of ways. By way of example only, the dimensional data 156 may be obtained by laser measurement of the brick 130 (preferably by a measurement device 184, as shown in FIG. 1F), and by precise weighing of the preselected mat 132 (preferably by a weighing device 186, as shown in FIG. 1F). Alternatively, and as described above, the brick/mat subassembly 133 (i.e., resulting from pre-assembly of the brick 130 and the mat 132) is measured using any suitable measurement methods, including, e.g., measuring the pressure of the subassembly 133. As described above, many ways of obtaining the dimensional data 156 are known. The methods used to obtain the dimensional data 156 are generally not significant to the method and apparatus of the invention herein, provided that the dimensional data 156 is sufficiently accurate. Once obtained, the dimensional data 156 is provided to the controller 154 using any suitable conventional means.

In one embodiment, the controller 154 is additionally adapted for controlling the first and second sets of members 150, 152 to form one or more end portions 144, 145 of the housing 126 with one or more preselected dimensions thereof 100 (FIG. 1D) having a predetermined relation to the calculated dimension 140. Such predetermined relation is as required in order to enable the end portions to mate, or join, with a specific part (not shown) of an exhaust system. It will be understood that the dimension 100 is substantially constant for a particular housing design, as described above. It is preferred also that the controller 154 is additionally adapted for controlling the first and second sets of members 150, 152 to form one or more transition portions 146, 147 of the housing 126 connecting the end portions 144, 145 respectively with the main portion 138 of the housing 126 substantially without deformation of the formed chamber 142. It is necessary that the formed chamber not be deformed in any material way because of the high degree of accuracy to which the formed chamber is formed, such high degree of accuracy being required to properly position the brick and the mat in the formed chamber, for proper functioning of the antipollution device.

In one embodiment, the other of the first and second sets of members 150, 152 is adapted to engage at least a preselected proximal part 166 of the main portion 138 while the end portion 144 and the transition portion 146 are formed, to resist deformation of the main portion 138, which deformation would necessarily result in deformation of the formed chamber 142 as well. The preselected part 166 is proximal to the transition portion 146. As will be described, the positioning of the member which so engages the part 166 must be determined for each individual workpiece, because the engagement of the part 166 itself must not cause material deformation of the main portion 138.

Figure 1B:
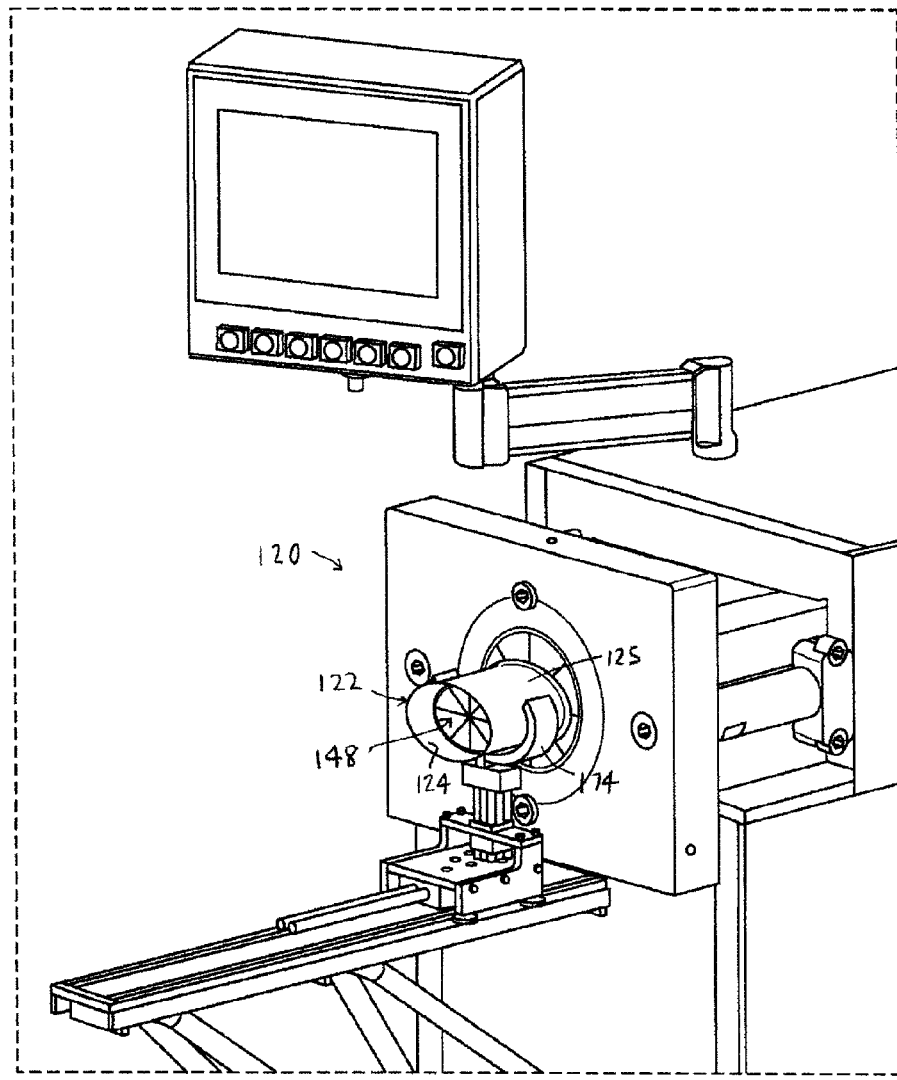
FIG. 1B is an isometric view of a portion of an embodiment of an apparatus of the invention, drawn at a smaller scale.
Figure 1C:
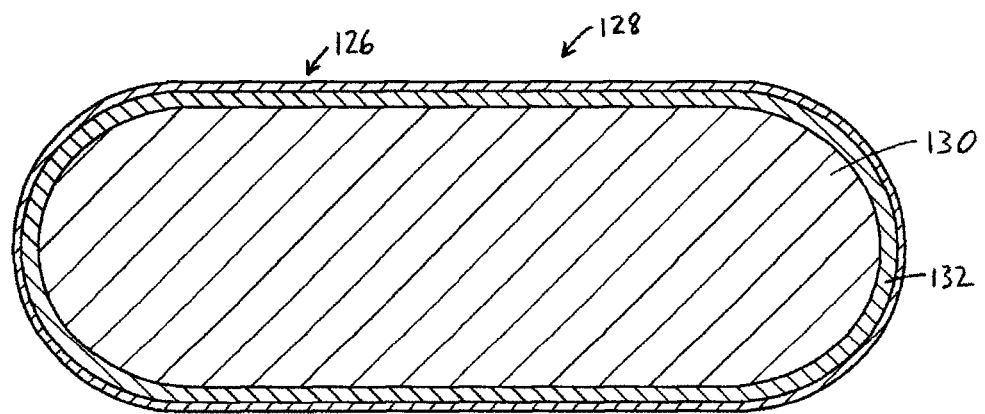
FIG. 1C is a cross-section of an antipollution device prepared in accordance with an embodiment of a method of the invention, drawn at a larger scale.
Figure 2B:
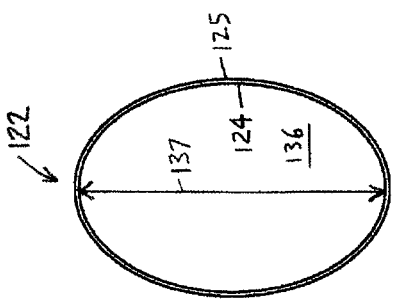
FIG. 2B is an end view of the workpiece of FIG. 2A.
Figure 2A:
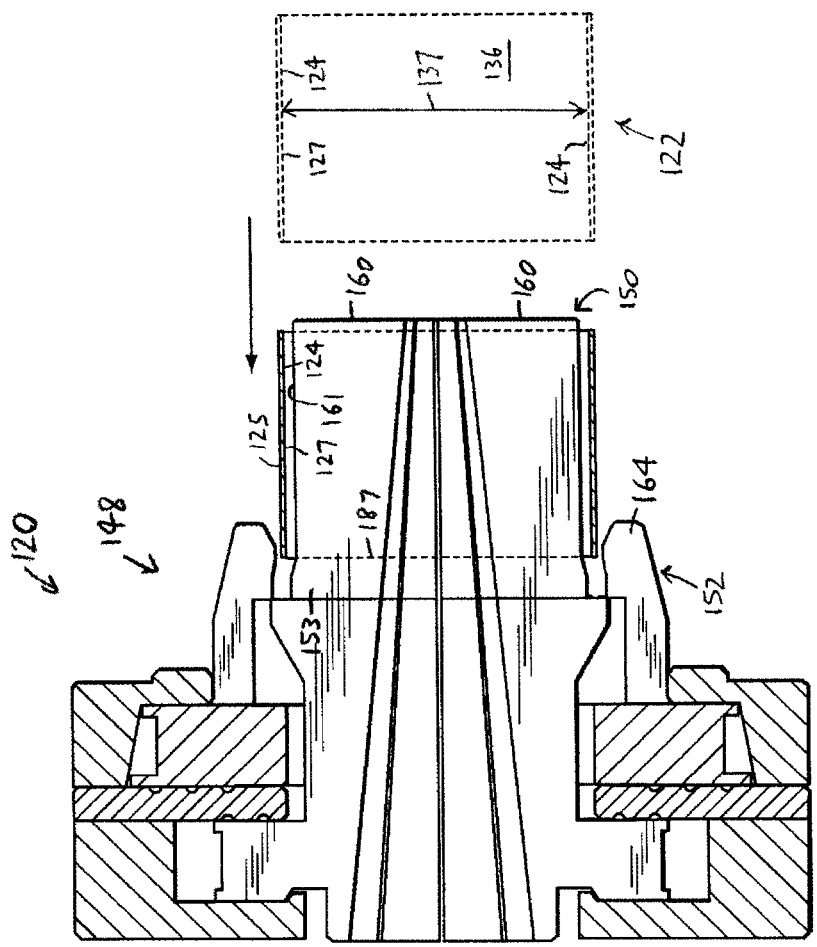
FIG. 2A is a cross-section of an embodiment of a machine head subassembly of the invention, being included in the apparatus of FIG. 1B, showing a first step of an embodiment of a method of the invention in which a workpiece is positioned on the machine head subassembly, drawn at a larger scale.

Preferably, and as can be seen, for example, in FIGS. 1B and 2A, the apparatus 120 includes an embodiment of a machine head subassembly 148 of the invention which includes the first and second sets of members 150, 152. As can be seen in FIG. 4A, the machine head subassembly 148 preferably also includes an end sizing element 153 which is designed to be used in forming end portions 144, 145 and transition portions 146, 147, as will be described. The end sizing element 153 preferably includes an end part 163 and a transition part 191 for forming the end portions 144, 145 and the transition portions 146, 147 respectively, as will be described.

Preferably, the first set of members 150 includes a number of finger elements 160. In one embodiment, the end sizing element 153 is mounted on the finger elements 160. However, alternative approaches to mounting the end sizing element 153 in the machine head subassembly 148 will occur to those skilled in the art.

As can also be seen in FIG. 4A, the second set of members 152 preferably includes a number of jaw elements 164. Each jaw element 164 preferably includes an end part 192, a transition part 193, and an outer surface 194. The end part 192, the transition part 193, and the outer surface 194 are collectively referred to herein as an engagement section 155. In one embodiment, and as shown in FIG. 5A, the outer surface 194 of the second set of members 152 preferably engages the preselected proximal part 166 of the main portion 138, to resist deformation of the main portion 138, as described further below.

Figure 3:
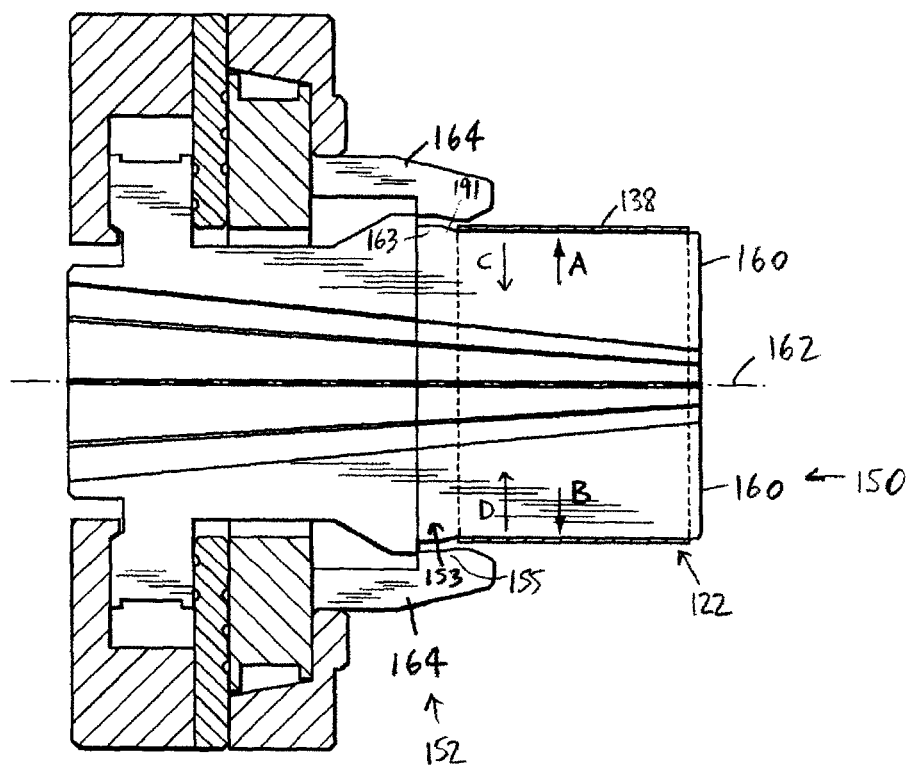
FIG. 3 is a cross-section of the machine head subassembly of FIG. 2A in which the workpiece is positioned thereon in a second step of an embodiment of the method of the invention, in which a first set of members engage inner surfaces of the workpiece.

Preferably, the first set of members 150 is adapted to push substantially in one or more outward directions, from the inner surface generally toward the outer surface. The outward directions are indicated in FIG. 3 by arrows "A" and "B". It is also preferred that the finger elements 160 are positioned substantially symmetrically around a central axis 162, the first set of members 150 being adapted for movement radially inwardly and radially outwardly relative to the central axis 162. The inward directions are indicated in FIG. 3 by arrows "C" and "D". Preferably, each finger element 160 is radially movable relative to the central axis 162 independently of the other finger elements. In one embodiment, the finger elements 160 are also substantially simultaneously radially movable relative to the central axis 162. Alternatively, the finger elements 160 are substantially simultaneously radially movable relative to the central axis 162.

Preferably, each jaw element 164 is radially movable relative to the central axis 162 independently of the other jaw elements. It is also preferred that the jaw elements 164 are also substantially simultaneously radially movable relative to the central axis 162. In another embodiment, the jaw elements 164 are substantially simultaneously radially movable relative to the central axis 164.

In one embodiment, the first set of members 150 includes the end sizing element 153, which is adapted to cooperate with the engagement section of the second set of members 152 to form an end part 129 of the workpiece 122 located proximal to an end 187, 188 thereof (FIG. 4A) into end portions 144, 145 and transition portions 146, 147. Preferably, the end sizing element 153 includes the end part 163 for cooperating with the end part 192 of the engagement section 155 to form the end portions 144, 145. It is also preferred that the end sizing element 153 includes the transition part 191 for cooperating with the transition part 193 of the engagement section 155 to form the transition portions 146, 147. As noted above, the positioning of the first and second members 150, 152 to form the transition portions 146, 147 is tailored for each workpiece, based in part on the dimensional data 156.

Preferably, the engagement section 155 also includes the outer surface 194 adapted to engage the preselected proximal part 166 of the main portion 138 when the transition portions 146, 147 are formed, for stabilizing the main portion 138 to resist deformation thereof. The positioning of the outer surface 194 is different for each workpiece, because the outer surface 194 must delicately engage the preselected proximal part 166, i.e., the engagement of the outer surface 194 with the part 166 of the main portion 138 is not to materially deform the main portion 138. The engagement of the outer surface 194 preferably is also sufficient to substantially prevent flow of the material (i.e., the material comprising the workpiece 122) when the end portions and the transition portions are formed so as to materially deform the formed chamber, which is at least partially defined by the main portion 138.

Figure 4:
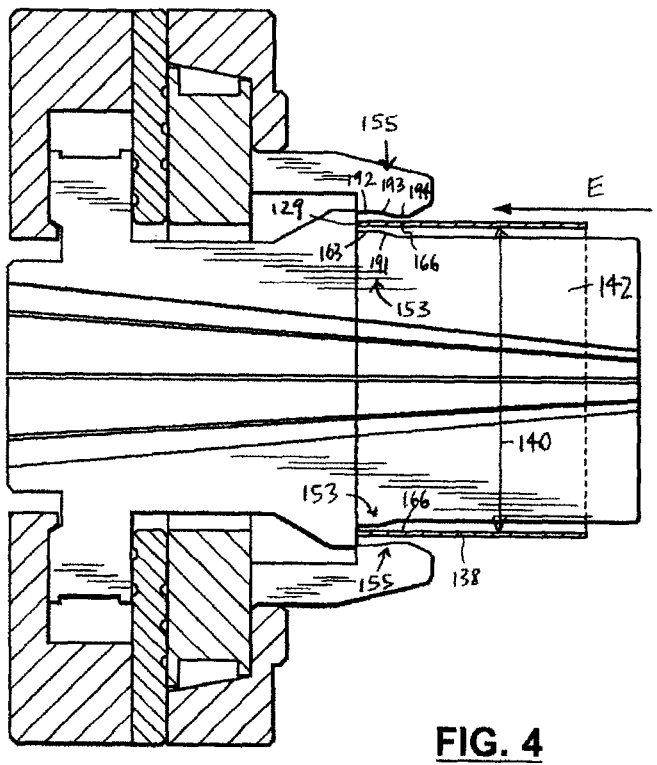
FIG. 4 is a cross-section of the machine head subassembly of FIG. 2A in which the workpiece is positioned thereon in a third step of an embodiment of the method of the invention.
Figure 4A:
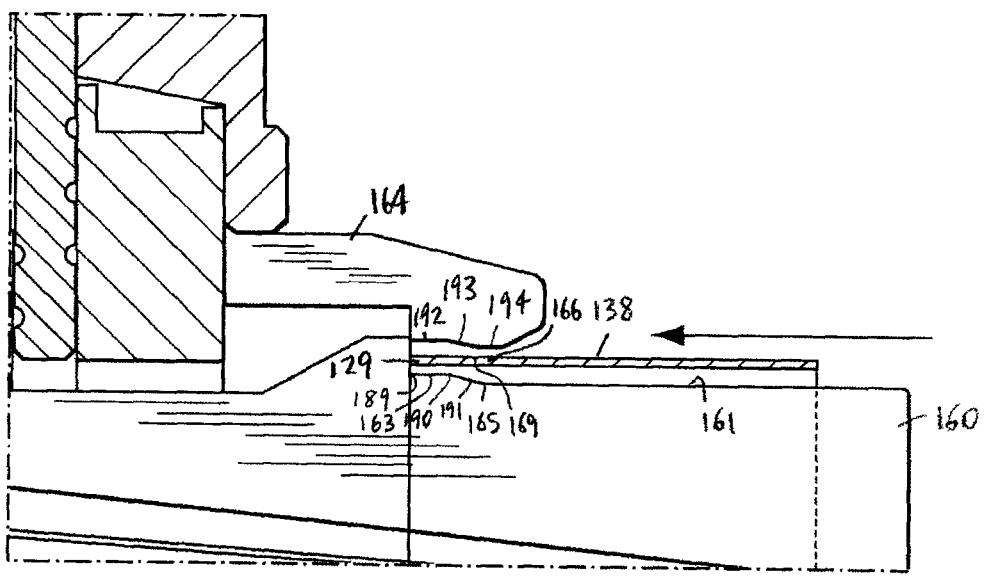
FIG. 4A is a portion of the cross-section of FIG. 4, drawn at a larger scale.

As can be seen in FIGS. 4, 4A, and 5A, the first set of members 150 includes the transition part 191 which is adapted to cooperate with and the transition part 193 of the second set of members 152 to form a preselected part 169 of the workpiece into the transition portions 146, 147.

Figure 9A:
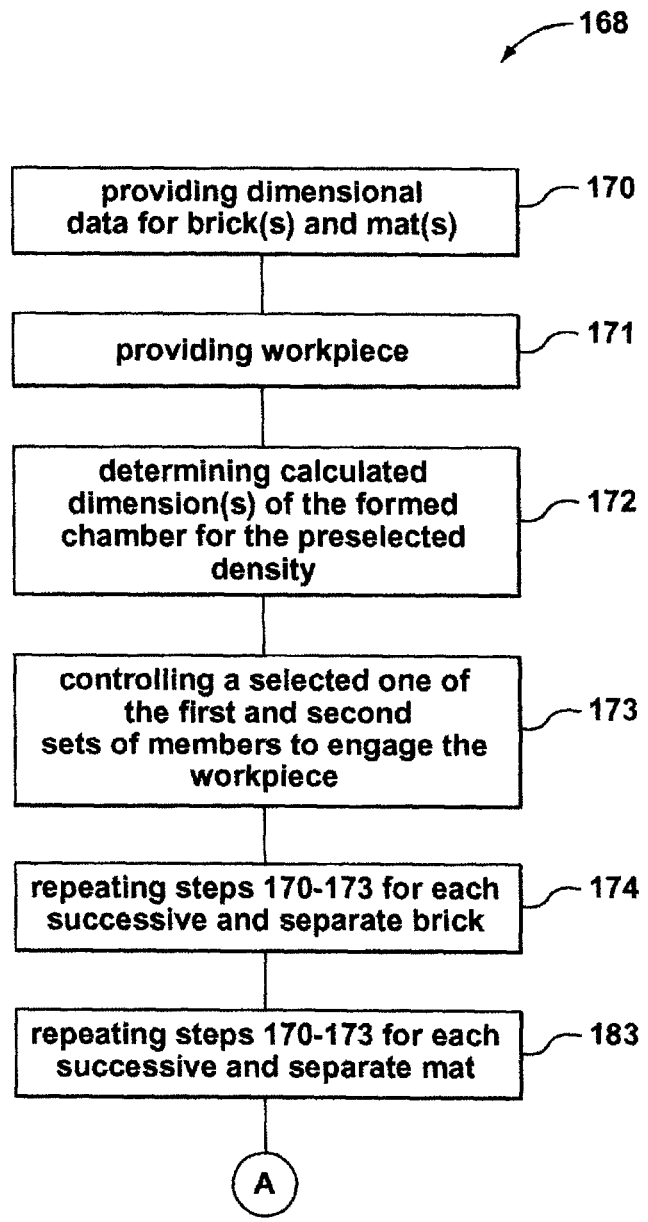
FIG. 9A is a block diagram schematically illustrating certain steps in an embodiment of the method of the invention.
Figure 9B:
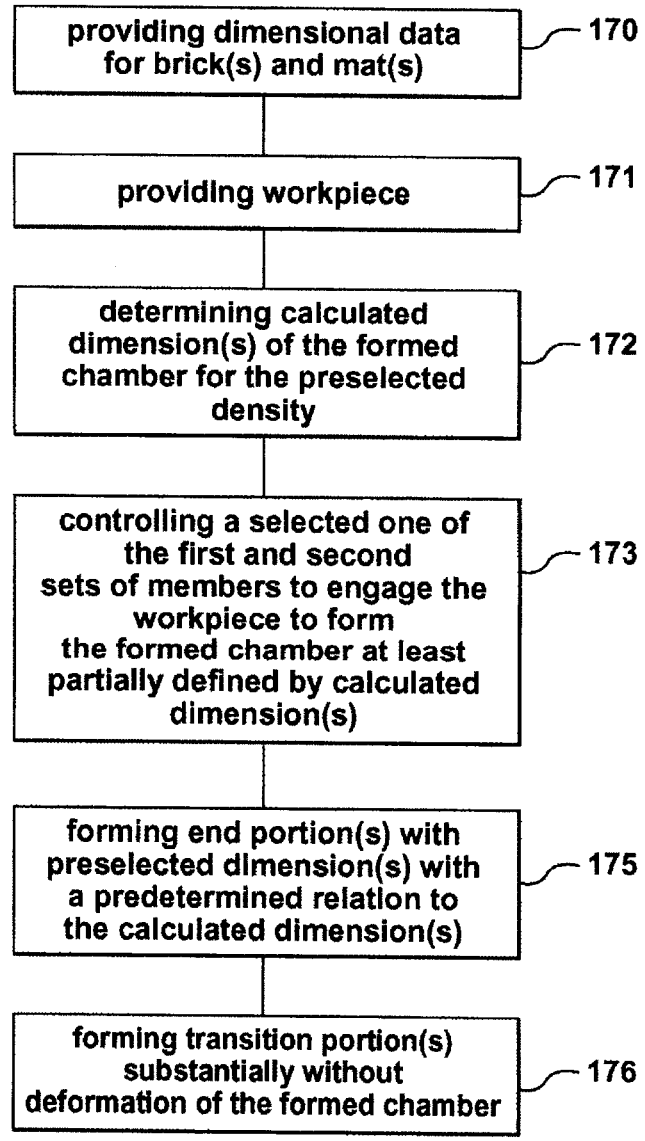
FIG. 9B is a block diagram schematically illustrating certain additional steps in an embodiment of the method of the invention.

An embodiment of a method 168 of the invention for providing the housing 126 of the invention includes, first, providing the dimensional data for the brick(s) 130 and the mat(s) 132 which are to be included in the antipollution device 128 to be manufactured (step 170, FIG. 9A). Next, the workpiece 122 is provided, having the inner surface 124 and the opposed outer surface 125. Part 127 of the inner surface 124 defines the initial chamber 136 having one or more initial dimensions (step 171). Based on the dimensional data 156 for the brick 130 and the mat 132, one or more calculated dimensions 140 at least partially defining the formed chamber 142 are determined. Each calculated dimension 140 preferably is sized for compressing the mat 132 to the preselected density when the brick 130 and the mat 132 are positioned in the formed chamber 142 (step 171). Finally, the first set of members 150 is controlled to engage a selected one of the first and second members 150, 152 with the workpiece 122 to change the initial dimension(s) 137 to the calculated dimension 140 (step 172).

It will be understood that certain steps of the method 168 set out above may be performed in one or more orders other than as set out above. For example, the order in which steps 170 and 171 are performed may be as described above or, alternatively, step 171 may precede step 170. It will also be understood that the steps 170 to 173 are repeated for each successive and separate brick, where the antipollution device includes more than one brick (step 174). Similarly, in those situations where the antipollution device includes more than one mat, the steps 170 to 173 are repeated (step 183).

Preferably, the method additionally includes the step of forming an end portion of the housing with a preselected dimension thereof having a predetermined relation to the calculated dimension (step 175), i.e., in accordance with the design for the antipollution device. It is also preferred that the method includes the step of forming one or more transition portions of the housing connecting the end portion with the main portion substantially without deformation of the formed chamber (step 176).

In addition, it will be understood that the invention includes the housing 126 produced according to the method 168 of the invention. The invention also includes the antipollution device 128, which includes the housing 126 produced according to the method 168 of the invention, the brick 130, and the mat 132.

Figure 9C:
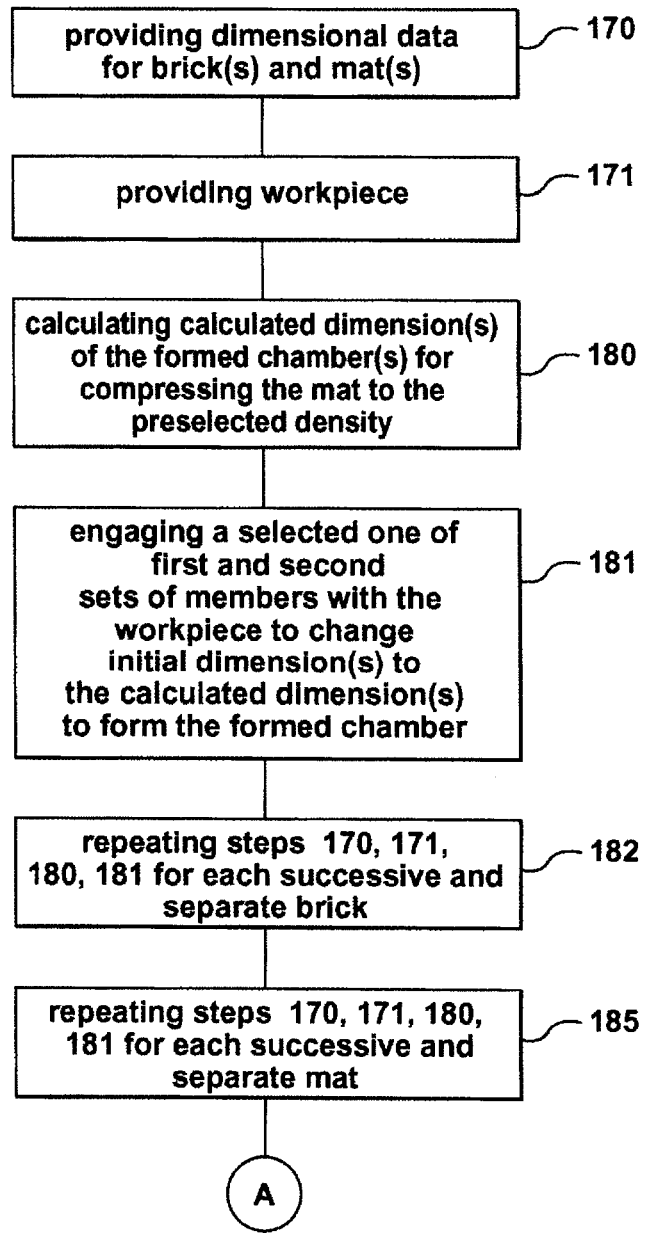
FIG. 9C is a block diagram schematically illustrating certain steps in another embodiment of the method of the invention.

In another embodiment, the method 179 of the invention includes the first step 170 which preferably is followed by the step of providing the workpiece 122 with the inner surface 124 and the opposed outer surface 125 defining the initial chamber with one or more initial dimensions (step 171, FIG. 9C). The method 179 preferably also includes calculating (based on the dimensional data 156) one or more calculated dimensions at least partially defining the formed chamber so that the mat is compressed between the brick and the housing to a preselected density, when the brick and the mat are positioned in the formed chamber (step 180, FIG. 9C). It is also preferred that the method 179 includes engaging a selected one of the first and second sets of members 150, 152 with the workpiece 122 to change the initial dimension(s) to the calculated dimension(s), to form the main portion 138 defining the formed chamber 142 (step 181).

In one embodiment, the method 179 preferably also includes the step of repeating steps 170, 171, 180, and 181 (as described above, in method 179) for each successive and separate brick (step 182). Similarly, in those situations where the antipollution device includes more than one mat, the steps 170, 171, 180, and 181 are repeated (step 185).

Figure 9D:
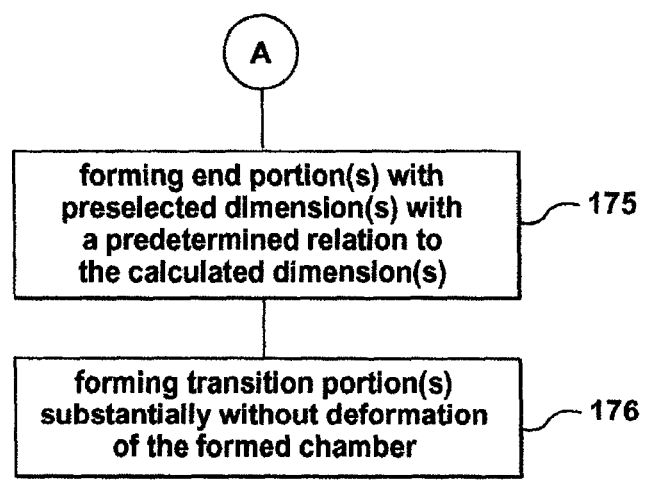
FIG. 9D is a block diagram schematically illustrating certain additional steps in another embodiment of the method of the invention.

It is also preferred that the method 179 includes the step of forming one or more end portions of the housing with one or more preselected dimensions thereof having predetermined relations to the calculated dimension(s) (step 175, FIG. 9D). The method 179 preferably also includes forming one or more transition portions of the housing connecting the end portions with the main portion respectively substantially without deformation of the main portion. (step 176, FIG. 9D).

In addition, it will also be understood that the invention includes the housing 126 produced according to the method 179 of the invention. The invention also includes the antipollution device 128, which includes the housing 126 produced according to the method 179 of the invention, the brick 130, and the mat 132.

Figure 1D:
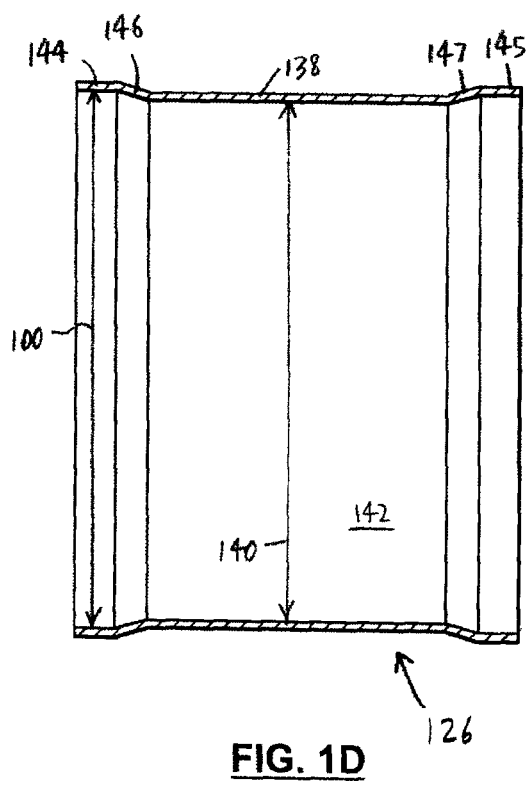
FIG. 1D is a longitudinal section of a housing of an antipollution device formed in accordance with an embodiment of a method of the invention, drawn at a smaller scale.
Figure 1E:
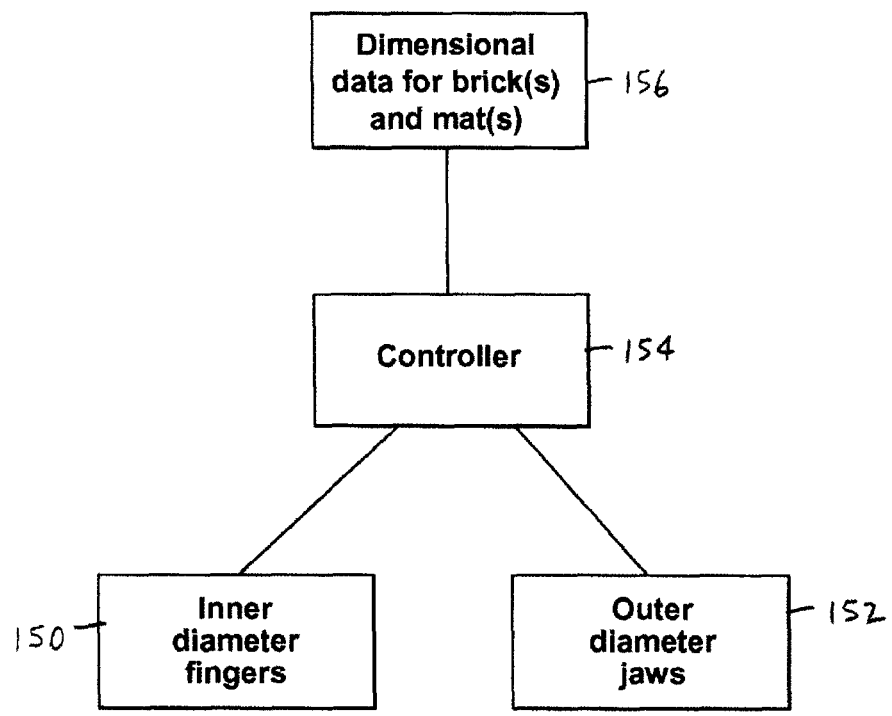
FIG. 1E is a block diagram schematically illustrating an embodiment of an apparatus of the invention.
Figure 1F:
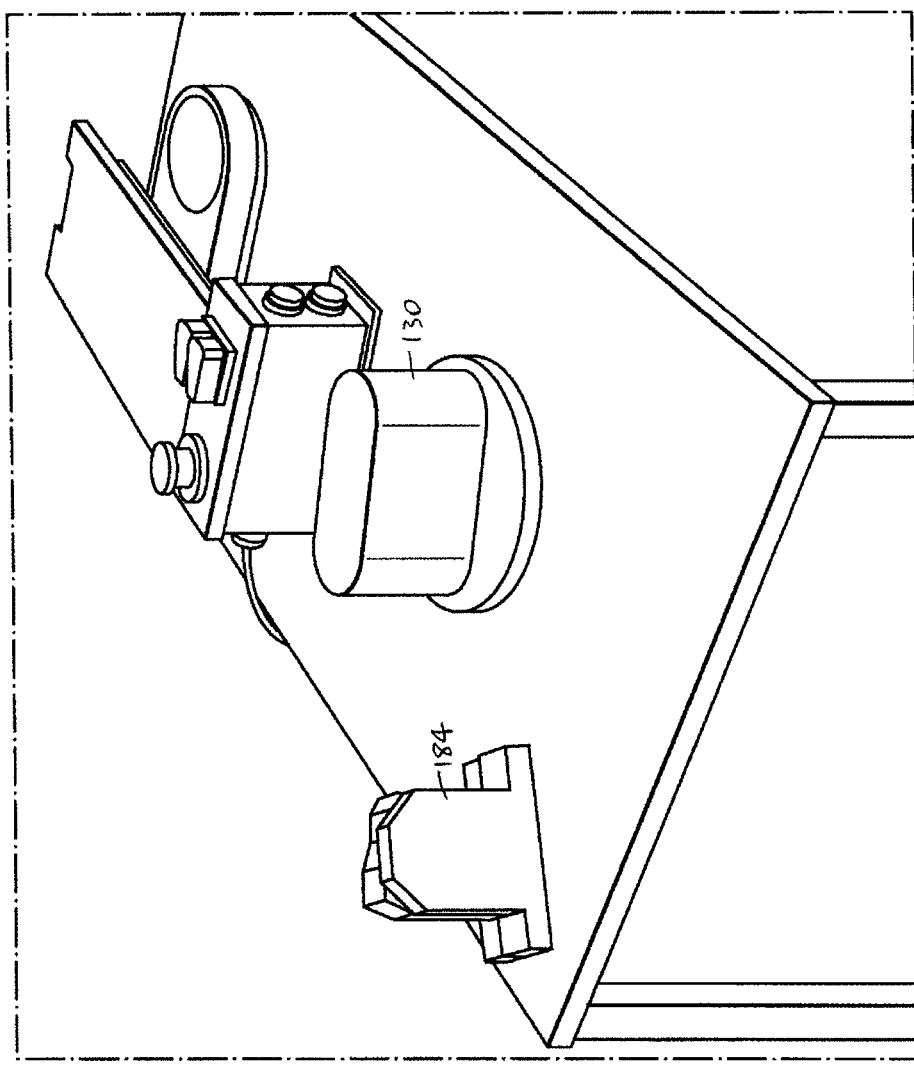
FIG. 1F is an isometric view of devices for obtaining dimensional data related to a preselected catalyst subassembly and a preselected mat, drawn at a smaller scale.

As noted above, housings are formed in a wide variety of configurations. For exemplary purposes, the steps of an embodiment of the method of the invention illustrated in FIGS. 2A, 3-8 in forming the housing 126 shown in FIG. 1D are now set out. As will be described, other embodiments of the method of the invention are used to form housings with other configurations.

INDUSTRIAL APPLICABILITY

In use, and as shown in FIG. 2A, the workpiece 122 preferably is positioned on the first set of members 150 with a first end 187 of the workpiece 122 positioned inwardly and a second end 188 thereof positioned outwardly, so that the first set of members 150 are engageable with the inner surface 124. As can be seen in FIG. 2B, in this example, the workpiece 122 has a generally oval cross-section. (The workpiece is shown in dashed outline in FIG. 2A (not mounted on the machine head 148) for clarity of illustration.)

Next, it is preferred that main parts 161 of the finger elements 160 of the first set of members 150 engage with the inner surface 124 to change the initial dimension 137 (FIGS. 2A, 2B) to the calculated dimension 140 (FIG. 3). As noted above, the initial chamber 136 may be defined by one or more initial dimensions 137. Similarly, the formed chamber 142 may be defined by one or more calculated dimensions 140. It will be understood that the illustration in FIGS. 2A, 2B of the initial dimension 137 as being the distance between opposed upper and lower parts on the inner surface 124, and the manner in which the calculated dimension(s) 140 is shown in FIGS. 1D, 3 and 4, are exemplary only.

As shown in FIG. 3, the initial dimension(s) 137 is changed to the calculated dimension(s) 140 by movement of the finger elements 160 outwardly, i.e., in the direction indicated by arrows "A" in FIG. 3. In this step, because the workpiece 122 is not positioned over the end sizing element 153, only the main parts 161 of the finger elements 160 engage the workpiece 122. As described above, it is important that the formed chamber 142 in which the brick/mat subassembly 133 is to be positioned is accurately formed. It will be understood that, after the main portion 138 has been formed as shown in FIG. 3, the main portion 138 preferably is generally not engaged by the first set of members 150, i.e., the formed chamber 142 is substantially not affected by the engagement of the first and second sets of members 150, 152 with the workpiece in subsequent steps (described below). This is preferred in order to minimize the possibility of deformation of the main portion 138 (i.e., deformation of the formed chamber 140) after the formed chamber 140 has been formed.

In the next step, the workpiece 122 is pushed axially inwardly (i.e., in the direction indicated by arrow "E" in FIG. 4) over the raised parts 163 of the end sizing elements 153 (FIG. 4). As can be seen in FIG. 4A, each raised part 163 preferably extends between an inward end 189 and an outward end 190 thereof. FIGS. 4 and 4A also show that the transition part 191 connects the outward end 190 of the raised part 163 and the main part 161 of the finger element 160. In one embodiment, it is also preferred that the transition part 191 and the main part 161 meet at an inward end 165 of the main part 161.

As described above, each jaw element 164 preferably includes the engagement section 155 (FIG. 4) with the end part 192 and the transition part 193 which are positioned to cooperate with the end part 163 and the transition part 191 of each corresponding end sizing element 153 (on a finger element 160) respectively. In addition, the engagement section 155 preferably includes the outer surface 194. As shown in FIG. 4A, when the workpiece 122 is pushed axially further onto the finger elements 160, an end part 129 of the workpiece 122 preferably is positioned between, on one hand, the end part 192, the transition part 193, and the outer surface 194 of the jaw element 164 and, on the other hand, the respectively corresponding end part 163, and the transition part 191. The main part 161 does not engage the main portion 138 in this step, so as to avoid deformation of the formed chamber 142 at this point in the process.

As shown in FIG. 5A, next, the second set of members 152 preferably are moved inwardly (i.e., in the direction shown by arrows "F" and "G" in FIG. 5A) so that the end part 129 of the workpiece 122 is pressed between the jaw elements 164 and the end sizing element 153 to form the first end portion 144 and the first transition portion 46. The first end portion 144 preferably is formed so that one or more preselected dimensions 100 thereof have a predetermined relationship to the calculated dimension(s) 140 (FIG. 1D), i.e., in accordance with the design for the housing to enable the antipollution device to be properly positioned in an exhaust system (not shown), as described above. In addition, the first transition portion 146 preferably is formed in accordance with preselected transition portion criteria, as will also be described. As can be seen in FIG. 5A, when the end portion 144 and the transition portion 146 are formed, the main parts 161 of the finger elements 160 preferably do not engage the main portion 138, to define a gap 177 therebetween.

The workpiece 122 (i.e., at this point in the process, the partially-formed housing 126) is shown alone in FIG. 5B for clarity of illustration. As can be seen in FIG. 5B, the first transition portion 146 connects the end portion 144 and the main portion 138. The transition portion 146 is required to be properly formed (i.e., in accordance with preselected criteria) so that the brick 130 and the mat 132 are properly secured in the formed chamber 142, once the housing 126 has been completely formed.

As shown in FIG. 5A, the end portion 144 is formed by the raised parts 163 and the end parts 192 cooperating with each other, to form the end portion 144 between them out of the end part 129. Simultaneously, the transition parts 191 and 193 cooperate to form the transition portion 146 the end part 129 from, i.e., the transition portion 146 is formed between the transition parts 191, 193. Also, it is preferred that the outer surface 194 presses on the part 166 of the main portion 138 proximal to the inward end 165 of the main part 161 (i.e., where the transition part 146 begins), to maintain the main portion 138 in its proper position while the transition portion 146 is formed.

As illustrated in FIG. 6A, the second set of members 152 is disengaged, and the workpiece 122 (i.e., the partially-formed housing 126) is then removed from the first set of members 150. Preferably, the sequential disengagement of the second and first sets of members 152, 150 respectively is accomplished as follows. First, the second set of members 152 move outwardly, i.e., in the direction indicated by arrow "H". Next, the first set of members 150 move inwardly, i.e., in the direction indicated by arrow "I". In FIG. 6B, the workpiece 122 after removal is shown alone, for clarity of illustration. It is preferred that, during removal of the workpiece 122, the main portion 138 is not engaged by the finger elements 160.

Figure 7B:
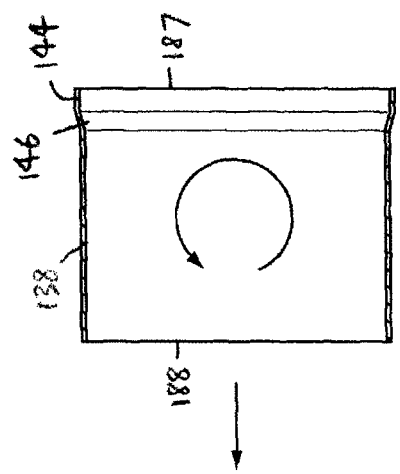
FIG. 7B is a cross-section of the machine head subassembly of FIG. 2A in which the workpiece is positioned thereon in a sixth step of an embodiment of the method of the invention.
Figure 7A:
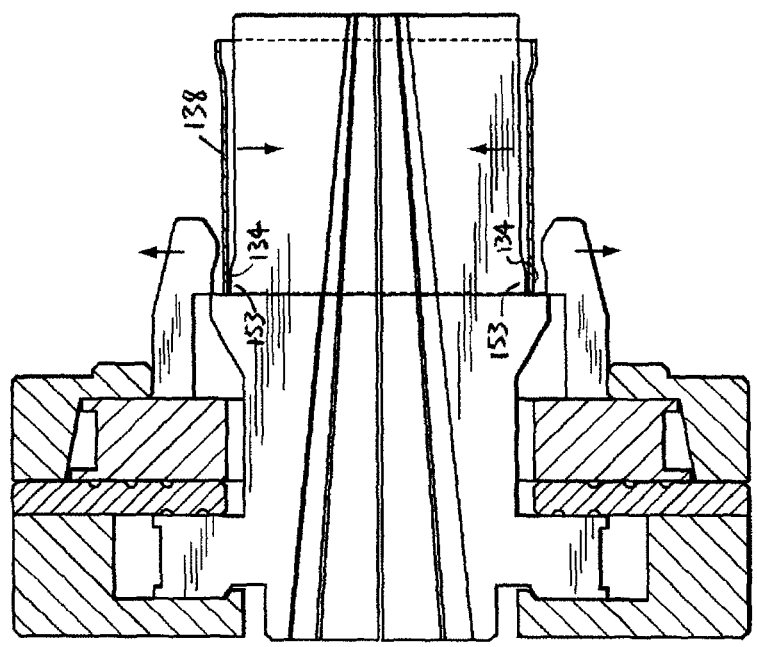
FIG. 7A is a cross-section of the workpiece of FIG. 6B after end-for-end rotation thereof.

Next, the workpiece 122 preferably is rotated end-for-end so that the end 188 of the workpiece 122 which has not been formed into end and transition portions 144, 146 is facing the machine head (FIG. 7A). Such removal and rotation preferably is effected without any direct engagement with the main portion 138. After this, the workpiece 122 is positioned on the first set of members 150 with the end 188 of the workpiece 122 positioned inwardly and the end 187 thereof positioned outwardly (FIG. 7B). As can be seen in FIG. 7B, it is preferred that the main portion 138 does not touch the first set of members 150 in this step, to ensure that the main portion 138 remains properly formed.

As can be seen in FIG. 8A, after the end 188 of the workpiece is positioned on the finger elements 160 (i.e., with a part 134 of the workpiece 122 positioned on the end sizing element 153 of the finger elements 160), the jaw elements 164 are moved inwardly (i.e., in the directions indicated by arrows "J" in FIG. 8A) so that the end part 134 of the workpiece 122 is pressed between the jaw elements 164 and the finger elements 160 to form the second end portion 145 and the second transition portion 147. The second end portion 145 preferably is formed so that one or more preselected dimensions 100 thereof have a predetermined relationship to the calculated dimension(s) 140, as described above. In addition, the second transition portion 147 preferably is formed in accordance with preselected transition portion criteria. As can be seen in FIG. 8A, when the end portion 145 and the transition portion 147 are formed, the main parts 161 of the finger elements 160 preferably do not engage the main portion 138, to define the gap 177. (The housing 126 is shown alone in FIG. 8B for clarity of illustration.)

Figure 8D:
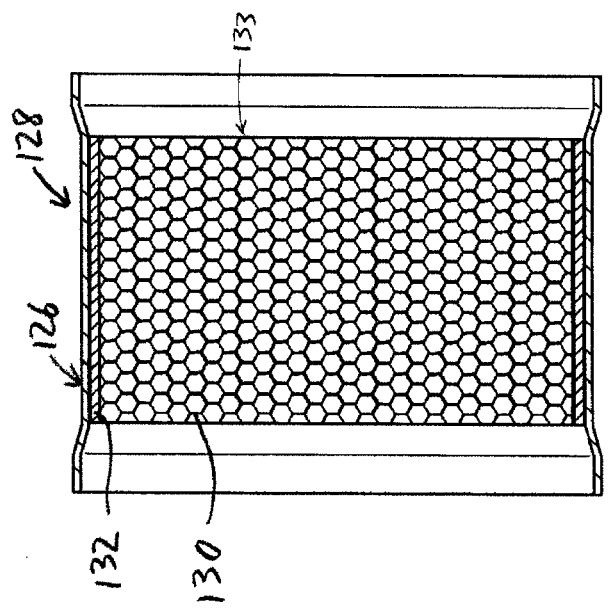
FIG. 8D is a longitudinal cross-section of an embodiment of an antipollution device the invention including the housing of FIGS. 8B and 8C with the brick and the mat positioned in the formed chamber.
Figure 8C:
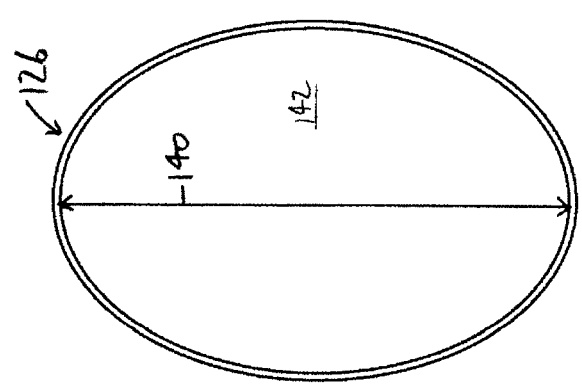
FIG. 8C is a cross-section of the housing of FIG. 8B, drawn at a larger scale.

The fully-formed housing 126 is removed from the machine head 148 after the members 152, 150 are sequentially retracted, in the same manner as shown in FIG. 6A. The brick 130 and the mat 132 are positioned in the housing 126 to form the antipollution device 128 (FIG. 8D).

It will be understood that the designed dimensions for the end portions 144, 145 are determined for a particular antipollution device based on the manner in which the connecting parts (e.g., end cones, or baffle subassembly, or other features, as the case may be) of the exhaust system are to connect with the end portions of the housing 126. For a particular exhaust system including the housing, and also including certain parts connecting to the housing, therefore, the end portions of the housing have generally the same configuration and dimensions, i.e., within a specified tolerance. However, and as described above, the main portion 138 (and the transition portion(s) 146, 147) are formed to provide the predetermined fit, i.e., the main portion and the transition portion are tailored to the individual brick and mat. For proper operation of the antipollution device 128, the main portion 138 and the transition portions 146, 147 are required to compress the mat(s) 132 according to specifications and also to hold the brick(s) 130 in the proper position(s).

The apparatus of the invention preferably includes a computer readable medium having stored thereon a computer program that, when executed, causes a computer (i.e., a microprocessor) to perform at least the following steps. First, the computer receives the dimensional data relating to dimensions of the specific preselected catalyst subassembly and the weight of the specific preselected mat. Next, the computer calculates a distance (the calculated dimension) so that such distance results in the main portion 138 of the housing 126 being the size required for the predetermined fit (i.e., to meet the relevant criteria (e.g., GBD)) of the brick(s) 130 and the mat(s) 132 therein. Finally, the computer generates a number of messages which direct the first set of members 150 to engage the inner surface 124 to form the interior surfaces.

It is preferred that the program also causes the computer to perform the additional steps of first, determining positions of the end portions 144, 145 relative to the main portion 138 in accordance with the designed dimensions. Next, a plurality of messages is generated which direct the second set of members 152 to engage the workpiece to form the end portions 144, 145 and the transition portions 146, 147 in compliance with the designed dimensions relative to the main portion 138.

As noted above, in a step of the method of the invention, the workpiece 22 is removed from the first set of members 150, and rotated so that the second end 188 of the workpiece 122 is positionable inwardly on the first set of members 150 (FIG. 7A). Such removal and rotation preferably are effected by a positioning subassembly 174 (FIG. 1B). After the main portion 138 has been formed, the positioning subassembly 174 preferably positions the workpiece 122 by engaging the main portion 138 with only low, controlled pressure applied thereby, to minimize the possibility of deforming the main portion 138.

From the foregoing description, it can be seen that the present invention provides a number of advantages over the prior art. In particular, unlike the prior art, only one machine head 148 is required in the present invention. Also, the end portions 144, 145 and, in particular, the transition portions 146, 147 are formed (in accordance with the designed dimensions) relative to the main portion 138 as built—i.e., precisely formed relative to the main portion 138 as it is actually formed for the brick(s) 130 and the mat(s) 132 which are (or which are to be) positioned therein. Because of this, the transition portions are also properly formed relative to the main portion as it has been formed. This is in contrast to the prior art, in which precise formation of the end portions and the transition portions is not possible, because the end portions and transition portions of the prior art are based on approximations of the main portion.

Additional embodiments of the invention are shown in FIGS. 10A-14B. In FIGS. 10A-14B, elements are numbered so as to correspond to like elements shown in FIGS. 1B-9D.

As described above, a wide variety of different antipollution devices and housings therefor are known. From the foregoing description, it can be seen that the steps of the embodiment of the method of the invention illustrated in FIGS. 2A-8B are for a particular type of antipollution device, and a particular type of housing therefor. The apparatus and the method illustrated in FIGS. 2A-8B show expanding the workpiece (the workpiece being initially empty) to form a housing with an expanded main portion and end portions. It will be understood that the invention herein may be used to form the various housings for various antipollution devices. The workpiece may be provided empty or stuffed, and the various parts of the workpiece may be required to be reduced or expanded, as the case may be. For exemplary purposes, summaries of a variety of embodiments of methods of the invention are shown in FIGS. 10A-14B.

Variations in tool designs and sequencing in the engagement of the elements of the apparatus will produce many different variations, all of which are embodiments of the invention herein. For example, FIGS. 10A-10H illustrate an alternative embodiment of a method of the invention for forming an alternative embodiment of a housing 226 of the invention. As can be seen in FIG. 10H and in FIG. 11, the housing 226 is sized for receiving two bricks 230A, 230B therein, as well as a mat 232. The housing 226 includes two main portions 238A, 238B including formed chambers 242A, 242B which preferably are formed specifically for the bricks 230A, 230B respectively, as will be described. The workpiece 222 and the housing 226 are duplicated in each of FIGS. 10A-10H in dashed outline so that the form of the workpiece 222 and the housing 226 at the stage of the process illustrated in the figure may clearly be seen. For instance, in FIG. 10A, the workpiece 122 is shown in dashed outline not positioned on the machine head 248 so that it can clearly be seen.

Alternatively, the formed chambers 242A, 242B may be formed based on averaged dimensional data for the bricks 230A, 230B and the mat 232. In this situation, the main portions 238A, 238B have substantially the same dimensions.

Figure 10A:
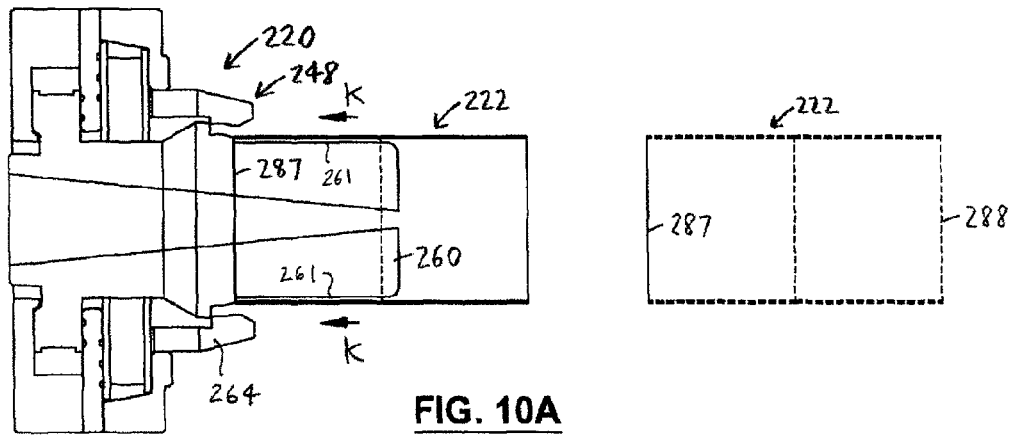
FIG. 10A is a cross-section of an embodiment of a machine head subassembly of the invention showing a first step of another embodiment of a method of the invention in which a workpiece is positioned on the machine head subassembly, drawn at a smaller scale.
Figure 10B:
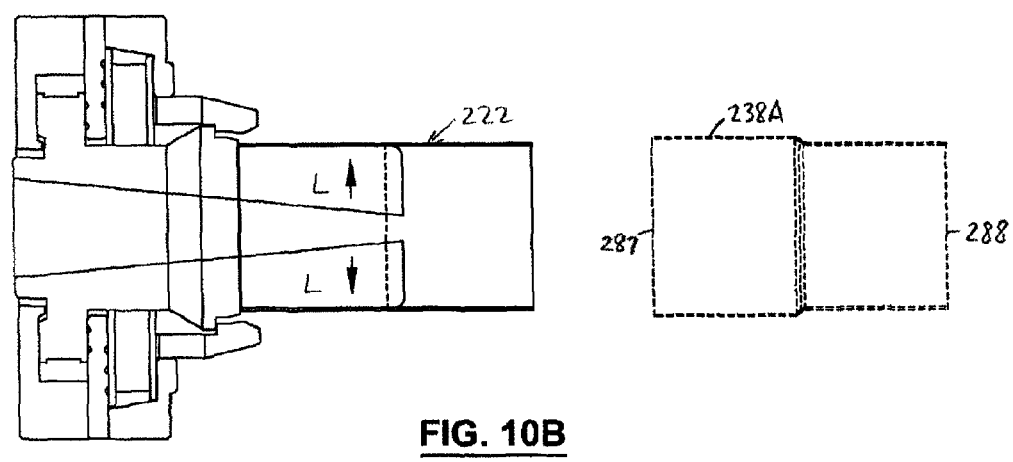
FIG. 10B is a cross-section of the machine head subassembly of FIG. 10A in which the workpiece is positioned thereon in a second step of the method of the invention.
Figure 10C:
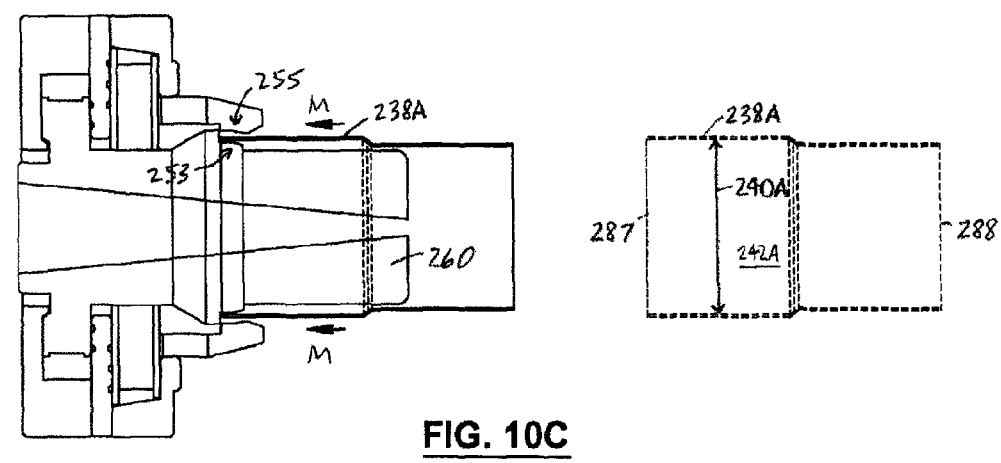
FIG. 10C is a cross-section of the machine head subassembly of FIG. 10A in which the workpiece is positioned thereon in a third step of the method of the invention.

Preferably, the workpiece 222 is moved onto the machine head 248 of the apparatus 220 in the direction indicated by arrows "K" in FIG. 10A, with the end 287 of the workpiece 222 directed inwardly. Once in position on the fingers 260 on the first set of members 250, the main parts 261 of the fingers 260 thereof are moved outwardly, in the direction indicated by arrows "L" in FIG. 10B, to form the main portion 238A in accordance with dimensional data for the brick 230A and the mat 232. Preferably, the fingers 260 are then retracted radially inwardly. As can be seen in FIG. 10C, the workpiece 222 preferably is then axially pushed over the end sizing element 253 (i.e., in the direction indicated by arrows "M" in FIG. 10C) in order to form the end portion 244 and the transition portion 246.

Figure 10D:
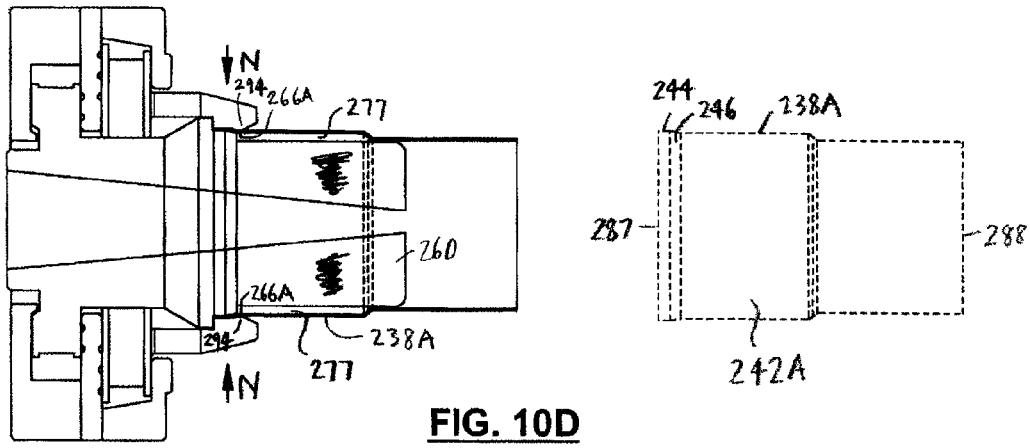
FIG. 10D is a cross-section of the machine head subassembly of FIG. 10A in which the workpiece is positioned thereon in a fourth step of the method of the invention.

In FIG. 10D, the end portion 244 and the transition portion 246 are formed when the jaws 264 are moved inwardly (in the direction indicated by arrows "N" in FIG. 10D). As shown in FIG. 10D, at this point, the main part 261 of the finger elements 260 is not engaging the main portion 238A, to define a gap 277 therebetween. The main portion 238A preferably is not engaged by the main portion 261 in this step, to minimize the possibility of deformation of the main portion 238A. As shown in FIG. 10D, the outer surface 294 engages a preselected proximal part 266A of the main portion 238A to stabilize the main portion 238A, i.e., to resist deformation of the main portion 238A when the end portion 244 and the transition portion 246 are formed. The part 266A is proximal to the transition portion 246 when it is formed. The positioning of the outer surface 294 is determined according to the calculated dimension(s) 240A, i.e., the precise positioning of the outer surface 294 ultimately is affected by the dimensional data 256. As described above, it is important that the outer surface 294 be precisely positioned so that the outer surface 294, when it engages the part 266A, does not itself cause deformation of the main portion 238A.

Figure 10E:
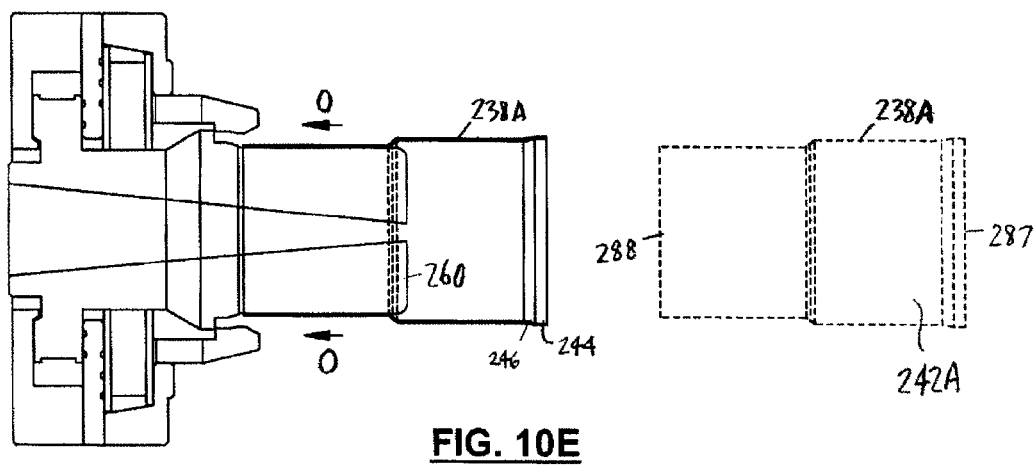
FIG. 10E is a cross-section of the machine head subassembly of FIG. 10A in which the workpiece is positioned thereon in a fifth step of the method of the invention.
Figure 10F:
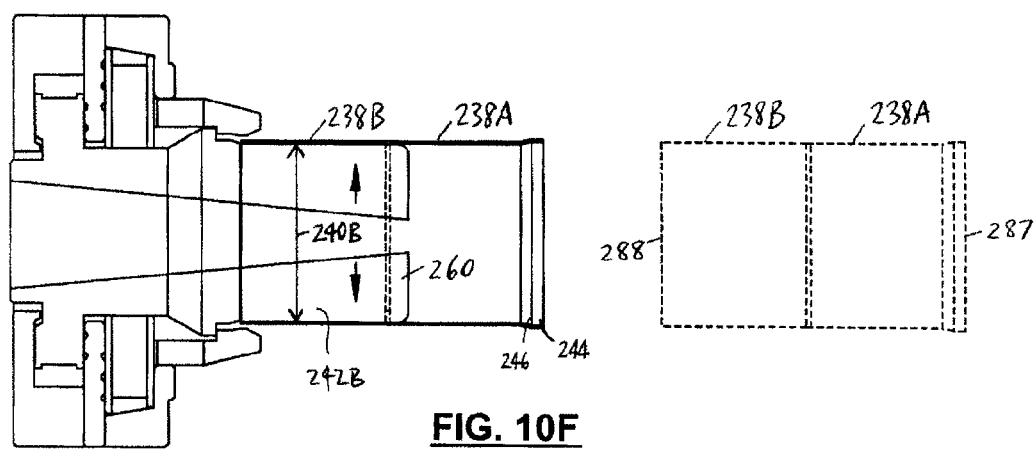
FIG. 10F is a cross-section of the machine head subassembly of FIG. 10A in which the workpiece is positioned thereon in a sixth step of the method of the invention.
Figure 10G:
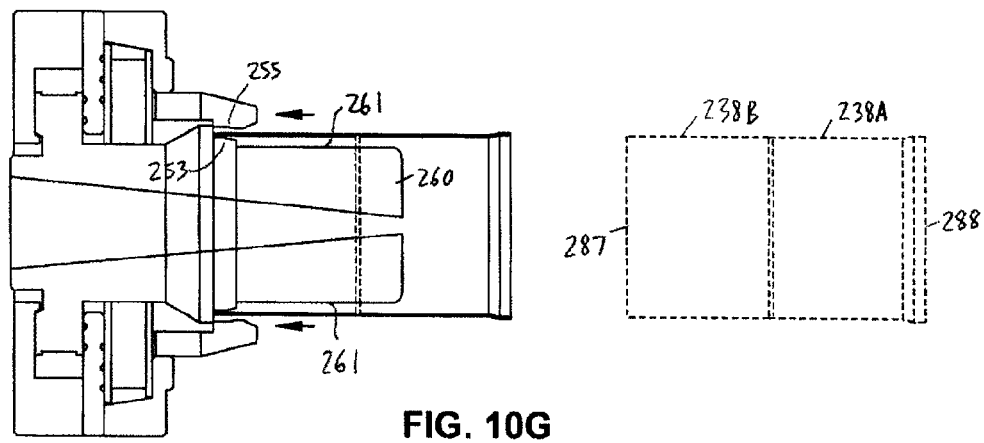
FIG. 10G is a cross-section of the machine head subassembly of FIG. 10A in which the workpiece is positioned thereon in a seventh step of the method of the invention.
Figure 10H:
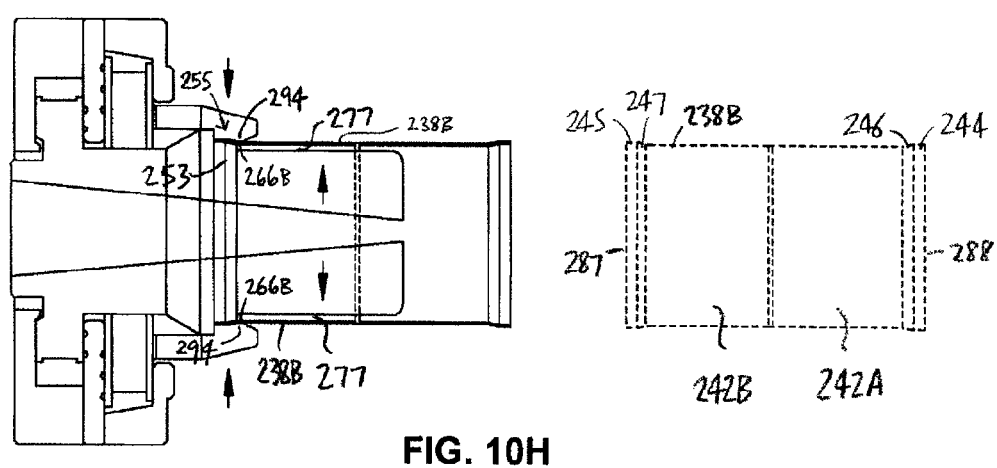
FIG. 10H is a cross-section of the machine head subassembly of FIG. 10A in which the workpiece is positioned thereon in an eighth step of the method of the invention.

The workpiece 222 is then rotated, and the end 288 of the workpiece 222 is moved axially inwardly on the fingers 260, as indicated by arrows "O" (FIG. 10E). The finger elements 260 then move outwardly so that the main parts 261 thereof form the main portion 238B (thereby defining formed chamber 242B therein), as illustrated in FIG. 10F. In FIG. 10G, the workpiece 222 is moved further inwardly, so that the end portion 245 and the transition portion 247 may be formed when the jaw elements 264 are moved radially inwardly, as indicated in FIG. 10H.

In FIG. 10H, the end portion 245 and the transition portion 247 are formed when the jaws 264 are moved inwardly. As shown in FIG. 10H, at this point, the main part 261 of the finger elements 260 is not engaging the main portion 238B, to define a gap 277 therebetween. The main portion 238B preferably is not engaged by the main portion 261 in this step, to minimize the possibility of deformation of the main portion 238B. As shown in FIG. 10H, the outer surface 294 engages a preselected proximal part 266B of the main portion 238B to stabilize the main portion 238B, i.e., to resist deformation of the main portion 238B when the end portion 245 and the transition portion 247 are formed. The part 266B is proximal to the transition portion 247 when it is formed. The positioning of the outer surface 294 is determined according to the calculated dimension(s) 240A, i.e., the precise positioning of the outer surface 294 ultimately is affected by the dimensional data 256. As described above, it is important that the outer surface 294 be precisely positioned so that the outer surface 294, when it engages the part 266B, does not itself cause deformation of the main portion 238B.

Figure 11:
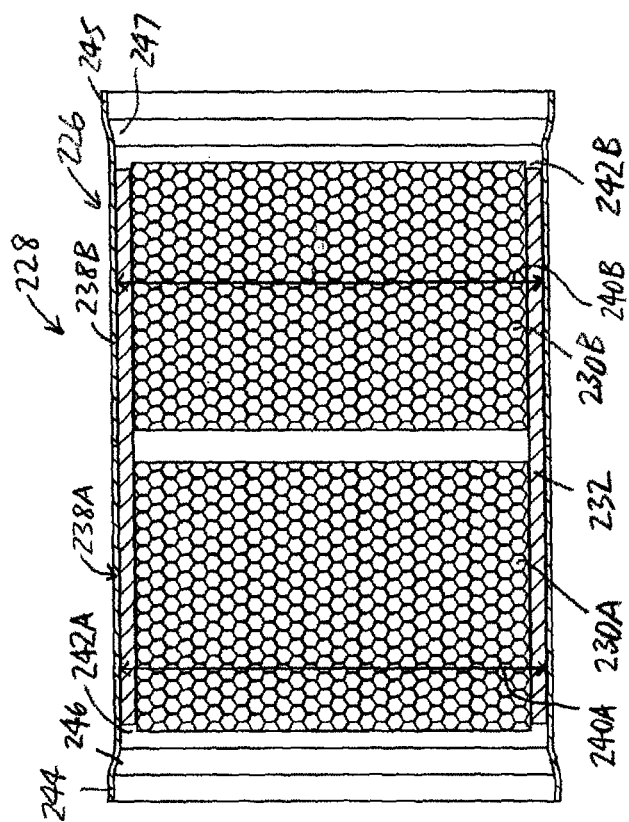
FIG. 11 is a cross-section of an embodiment of an antipollution device of the invention resulting from the method of the invention illustrated in FIGS. 10A-10H, drawn at a larger scale.

The result of the process is the housing 226 which, as can be seen in FIG. 11, is sized to receive the bricks 230A, 230B and the mat 232 to form the antipollution device 228.

Figure 12A:
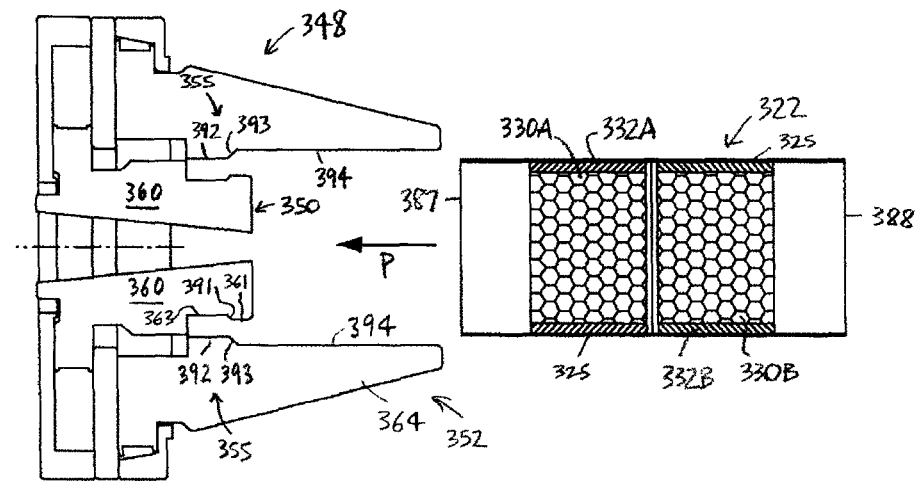
FIG. 12A is a cross-section of an embodiment of a machine head subassembly of the invention showing a first step of another embodiment of a method of the invention in which a workpiece is positioned on the machine head subassembly, drawn at a smaller scale.

Another alternative embodiment of a method of the invention is disclosed in FIGS. 12A-12K, to provide an alternative embodiment of a housing 326 of the invention, shown in FIG. 12L. As can be seen in FIG. 12L, the housing 326 includes main portions 338A, 338B which are larger in cross-sectional area than the cross-sectional area defined by the end portions 344, 345. Because of this, the workpiece 322 is provided with bricks 330A, 330B and mats 332A, 332B positioned in the workpiece. In this embodiment of the invention, the formed chambers 342A, 342B in the main portions 338A, 338B respectively are formed with the bricks 330A, 330B and the mats 332A, 332B positioned in them respectively.

The end 387 of the workpiece 322 is moved between jaw elements 364 in the machine head 348 of the apparatus 320, i.e., in the direction indicated by arrow "P" in FIG. 12A. As can be seen in FIGS. 12A and 12K, in the machine head 348, the jaw elements 364 include relatively large outer surfaces 394. The end part 392 is also relatively large, but a transition part 393 in the engagement section 355 is relatively short. The finger elements 360 each preferably include a relatively small outer part 361, and a relatively large end part 363 which are joined by a relatively short transition part 391 (FIG. 12K). As will be described, the outer part 361 performs a function which corresponds to that performed by the outer surface 194 in the embodiment of the invention shown in FIG. 5A.

Figure 12B:
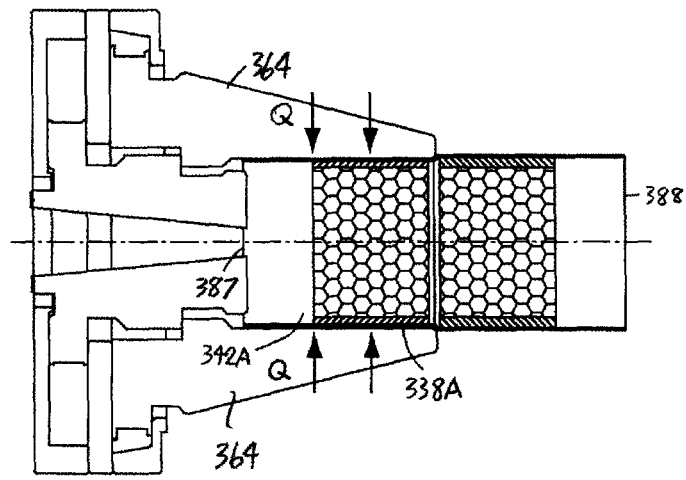
FIG. 12B is a cross-section of the machine head subassembly of FIG. 12A in which the workpiece is positioned thereon in a second step of the method of the invention.

As can be seen in FIG. 12B, when a part of the workpiece 322 is positioned between the jaw elements 364 so that the main portion 338A can be formed, the jaw elements 364 are moved inwardly (in the direction indicated by arrows "Q"), and the outer surface 394 forms the outer surface 325 of the housing 322 into the main portion 338A, so that the mat 332A around the brick 330A is properly compressed. Based on dimensional data 356 for the brick 330A and the mat 332A, the calculated dimension(s) 340A for the formed chamber 342A is determined, and the jaw elements 364 are controlled by the controller 354 to form the main portion 338A (i.e., to define the formed chamber 342A) accordingly.

The partly formed housing 326 preferably is then pushed further into the machine head subassembly 348 (i.e., in the direction indicated by arrow "R" in FIG. 12C) so that part 329 of the workpiece 322 is positioned between the end part 392 and the transition part 393 on the jaw element 364 and the end part 363 and the transition part 391 on the finger elements 360 respectively. Next, the jaw elements 364 are moved inwardly, as indicated by arrows "S" in FIG. 12D, to form the end portion 344 and the transition portion 346. As indicated above, the outer part 361 of the finger elements 360 performs a function in this process which corresponds to the functions performed by the outer surface 194 (i.e., the process illustrated in FIGS. 2A-8B) and the outer surface 294 (i.e., the process illustrated in FIGS. 10A-10H), namely, the outer part 361 includes a surface 395 (FIG. 12C) which engages a preselected proximal part 366A of the main portion 338A, to resist deformation of the main portion 338A when the end portion 344 and the transition portion 346 are formed.

In the following discussion, reference is made to FIG. 12K, which shows certain elements of the machine head 348 and the workpiece 322 after the main portion 338B has been formed. In FIG. 12K, the outer part 361 is shown engaging a preselected proximal part 366B of the main portion 338B while the end portion 345 and the transition portion 347 are formed. It will be understood that the same elements are involved (i.e., the outer part 361 engages the preselected proximal part 366A or the preselected proximal part 366B, as the case may be) and function in the same way regardless of whether the end portion 344 or the end portion 345 is formed, and regardless of whether the transition portion 346 or the transition portion 347 is formed. The part 366A is proximal to the transition portion 346 when it is formed, and the part 366B is proximal to the transition portion 347 when it is formed.

As can be seen in FIG. 12K, when the end portions 344, 345 and the transition portions 346, 347 respectively are formed, the outer surface 394 is spaced apart from the workpiece 322 to define a gap 377 therebetween. When the end portion and the transition portion are formed (described above), the outer part 361 of the finger element 360 engages the part 366B of the main portion 338B (i.e., the outer part 361 presses in the direction of arrow "T" in FIG. 12K against the part 336B). The engagement of the surface 395 of the outer part 361 with the part 366B is for resisting deformation of the main portion 338B when the end portion and the transition portion are formed. The outer part 361 engages the part 366B delicately, in order not to deform the main portion 338B, because such deformation would also result in deformation of the formed chamber 342B. However, the outer part 361 preferably engages the part 366B sufficiently firmly to prevent material flow resulting from the formation of the end portion and the transition portion which may deform the main portion 338B. Accordingly, the positioning of the outer part 361 is required to be done with relatively high accuracy, and is based (in part) on the dimensional data 356 for the brick 330B and the mat 332B. Such positioning is therefore different for each end of the workpiece 322, depending on the dimensional data 356 for the bricks 330A, 330B and for the mats 332A, 332B respectively.

Figure 12C:
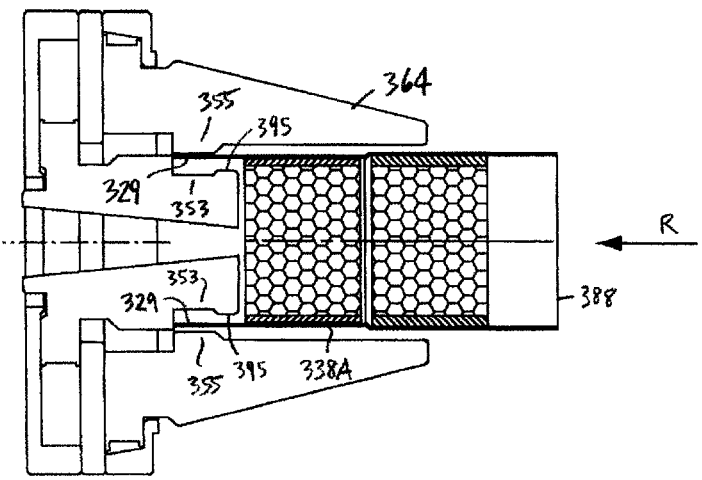
FIG. 12C is a cross-section of the machine head subassembly of FIG. 12A in which the workpiece is positioned thereon in a third step of the method of the invention.
Figure 12D:
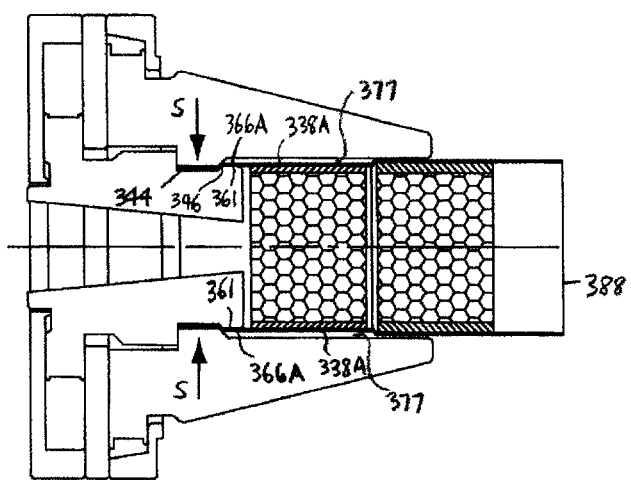
FIG. 12D is a cross-section of the machine head subassembly of FIG. 12A in which the workpiece is positioned thereon in a fourth step of the method of the invention.

Accordingly, as shown in FIG. 12D, the outer part 361 engages the part 366A when the end portion 344 and the transition portion 346 are formed, so that the outer part 361 by such engagement resists deformation of the main portion 338A, in the same manner as shown in more detail in FIG. 12K. In order for the engagement of the outer surface 361 with the part 366A to be appropriately firm (i.e., but not so firm as to cause deformation), the positioning of the outer part 361 is determined by the controller 354 based (in part) on dimensional data 356 for the brick 330A and the mat 332A, and is effected by the controller 354. As can be seen in FIG. 12C, it is preferred that the outer part 394 of the jaw elements 364 be spaced apart from the main portion 338A to define a gap 377 therebetween, i.e., the jaw elements 364 preferably do not engage the main portion 338A after it has been formed, to minimize the possibility of subsequent deformation of the main portion 338A.

Figure 12E:
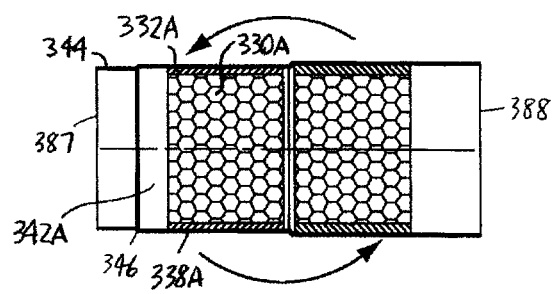
FIG. 12E is a partial cross-section of the workpiece following the step illustrated in FIG. 2D.

After the end portion 344 and the transition portion 346 have been formed, the workpiece (i.e., the partly formed housing 326) is rotated, as indicated in FIG. 12E. When the workpiece is rotated, the main portion 338A is not directly engaged, so as to minimize the possibility of deformation of the main portion 338A.

Figure 12F:
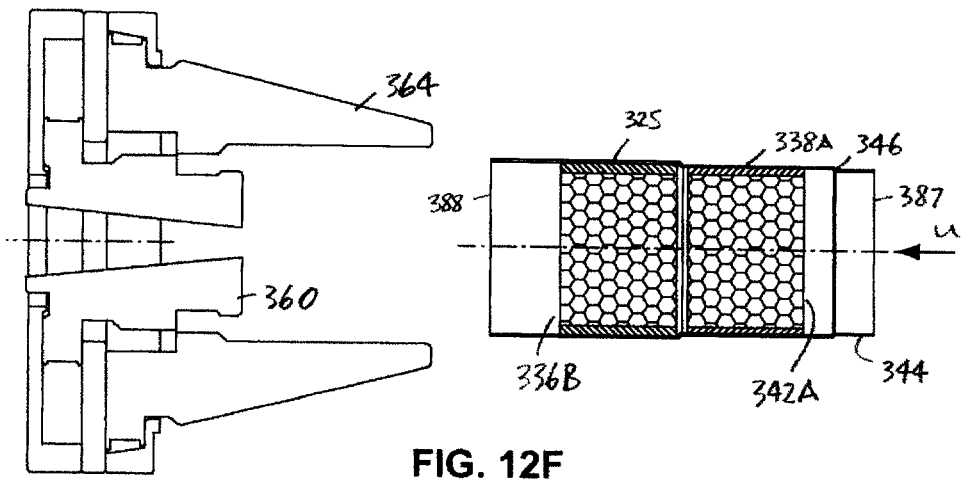
FIG. 12F is a cross-section of the machine head subassembly of FIG. 12A in which the workpiece is positioned thereon in a fifth step of the method of the invention.
Figure 12G:
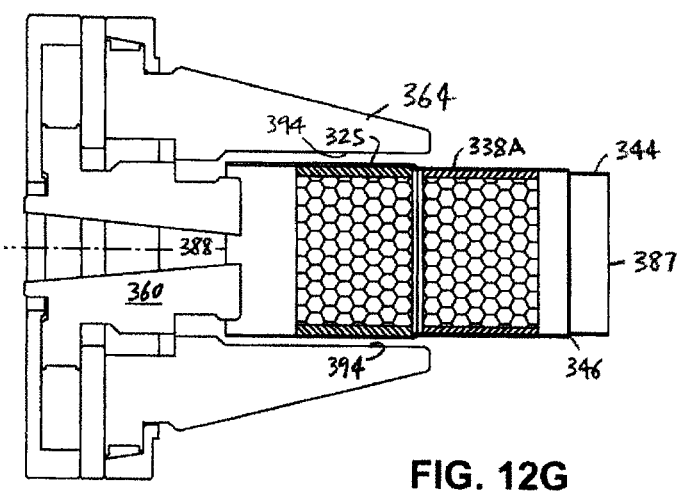
FIG. 12G is a cross-section of the machine head subassembly of FIG. 12A in which the workpiece is positioned thereon in a sixth step of the method of the invention.
Figure 12H:
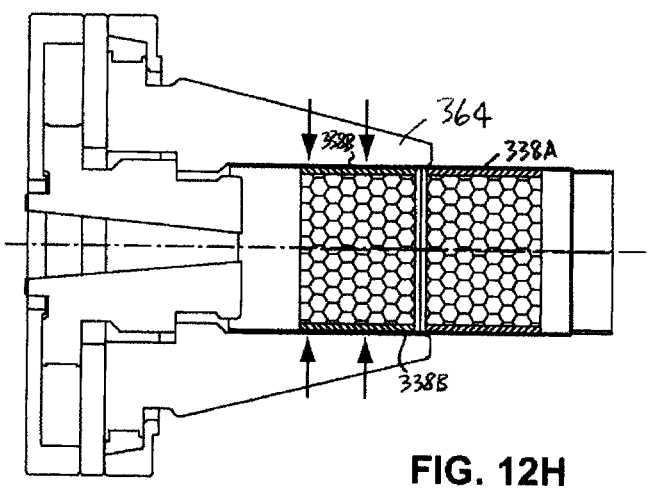
FIG. 12H is a cross-section of the machine head subassembly of FIG. 12A in which the workpiece is positioned thereon in an seventh step of the method of the invention.
Figure 13:
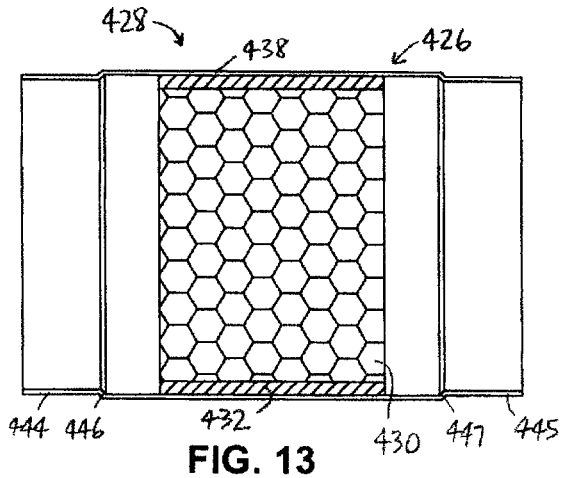
FIG. 13 is a cross-section of an alternative embodiment of an antipollution device of the invention, drawn at a larger scale.

After rotation, the end 388 of the housing 322 is moved inwardly into the machine head 348, in the direction indicated by arrow "U" in FIG. 12F. Once the workpiece is in position, as shown in FIG. 12G, the jaws 364 are moved inwardly (as shown in FIG. 12H), to form the main portion 338B. The calculated dimension 340B is determined based on dimensional data 356 for the brick 330B and the mat 332B, and the jaw elements 364 are controlled by the controller 354 to form the main portion 338B (i.e., defining the formed chamber 342B) accordingly.

Next, the partly formed housing 326 is pushed further into the machine head, i.e., in the direction indicated by arrow "V" in FIG. 12I, and the parts 329 are positioned between the end and transition parts of the first set of members 350 and the cooperating end and transition parts of the second set of members 352. The jaw elements 364 are moved inwardly, as shown in FIG. 12J, to form the end portion 345 and the transition portion 347. As described above, and as can be seen in FIG. 12K, when the end portion 345 and the transition portion 347 are formed, the surface 395 of the outer part 361 lightly engages the part 366B of the main portion 338B, for resisting deformation of the main portion 338B. The positioning of the outer part 361 is determined based on dimensional data 356 for the brick 330B and the mat 332B, so that the outer part 361 may substantially prevent material flow but also not deform the main portion 338B.

As described above, a variety of housings may be formed using the apparatus and the method of the invention. For instance, FIG. 13 discloses an alternative embodiment of a housing 426 of the invention in which a single brick 430 and the mat 432 are positioned in the main portion 438, which has a larger cross-sectional area than the cross-sectional area defined by the end portions 444, 445. Because the end portions have smaller cross-sectional areas than the main portion, the housing 426 preferably is formed using a process similar to that shown in FIGS. 12A-12K and described above, in which the workpiece is provided for the initial step of the process with the brick and the mat positioned in the workpiece. Accordingly, once the housing 426 is been formed, the antipollution device 428 is formed.

Figure 14A:
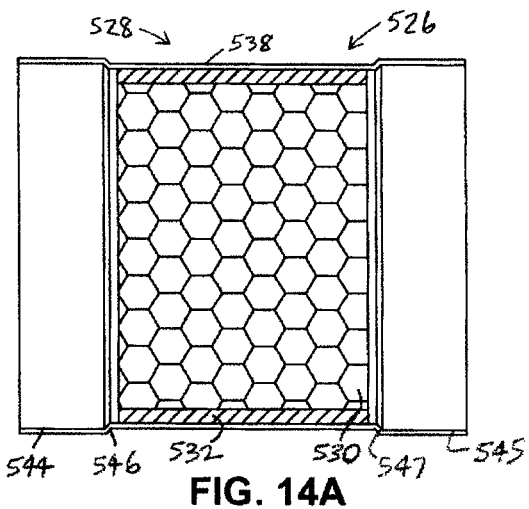
FIG. 14A is a cross-section of another alternative embodiment of an antipollution device of the invention.

FIG. 14A shows yet another alternative embodiment of a housing 526 in which a main portion 538 thereof has a cross-sectional area which is substantially less than end portions 544, 545 thereof. Because the end portions have larger cross-sectional areas than the main portion, the housing 526 preferably is formed using a process similar to that shown in FIGS. 2A-8B and described above, in which the workpiece is provided for the initial step of the process without the brick and the mat positioned therein. The brick and the mat preferably are positioned in the housing 526 after it has been formed, to provide the antipollution device 528.

Figure 14B:
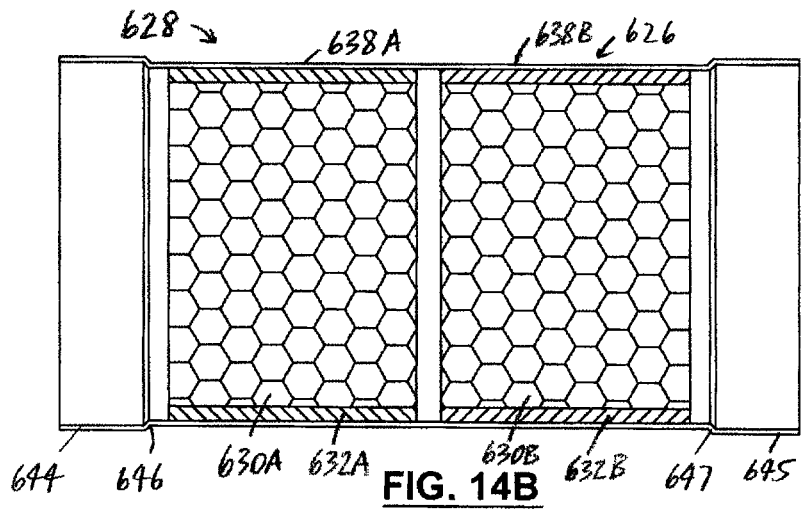
FIG. 14B is a cross-section of another alternative embodiment of an antipollution device of the invention.

Another alternative embodiment of a housing 626 is disclosed in FIG. 14B, the housing 626 being formed to receive two bricks 630A, 630B and respective mats 632A, 632B positioned between the bricks and the main portion 638. The main portion 638 has a cross-sectional area substantially less than the cross-sectional area of the end portions 644, 645. Because the end portions have larger cross-sectional areas than the main portion, the housing 626 preferably is formed using a process similar to that shown in FIGS. 2A-8B and described above, in which the workpiece is provided for the initial step of the process without the brick and the mat positioned therein. The brick and the mat preferably are positioned in the housing 626 after it has been formed, to provide the antipollution device 628.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. An apparatus for forming a workpiece with an inner surface and an opposed outer surface into a housing of an antipollution device for treating exhaust in which at least one preselected catalyst-bearing brick is positionable, and in which at least one mat is positionable between said at least one brick and the housing to support said at least one brick, at least part of the inner surface defining an initial chamber in the workpiece with at least one initial dimension, the apparatus comprising:

a first set of members for engaging the inner surface;
a second set of members for engaging the outer surface;
a controller for receiving dimensional data for said at least one brick and said at least one mat and for determining at least one calculated dimension based on the dimensional data, said at least one calculated dimension at least partially defining a formed chamber in a main portion of the housing and said at least one calculated dimension being sized for compressing said at least one mat to a preselected density when said at least one brick is positioned in the formed chamber and said at least one mat is positioned between said at least one brick and the main portion of the housing;
the controller additionally controlling the first set of members for engaging the workpiece to change said at least one initial dimension to said at least one calculated dimension, such that said at least one mat is compressed to the preselected density when said at least one brick and said at least one mat are positioned in the formed chamber of the main portion of the housing;
the first set of members comprising an end sizing element adapted to cooperate with an engagement section of the second set of members to form a workpiece end part between the first and second sets of members into at least one end portion, and at least one transition portion connecting said at least one end portion with the main portion, said first and second sets of members being controlled by the controller such that said at least one end portion of the housing has at least one preselected dimension having a predetermined relation to said at least one calculated dimension;
the end sizing element of the first set of members comprising a transition part adapted to cooperate with a transition part of the engagement section of the second set of members to form said at least one transition portion therebetween; and
the second set of members additionally comprising an outer surface adapted to engage a preselected proximal part of the outer surface of the main portion, to resist deformation of the main portion while said at least one end portion and said at least one transition portion are formed, the second set of members being controlled by the controller to position the outer surface of the second set of members at least partially based on the dimensional data.

2. An apparatus according to claim 1 in which the end sizing element comprises an end part adapted to cooperate with an end part of the engagement section to form said at least one end portion.

3. An apparatus according to claim 1 in which the first set of members comprises a plurality of finger elements positioned substantially symmetrically around a central axis, the first set of members being adapted for movement radially inwardly and radially outwardly relative to the central axis.

4. An apparatus according to claim 3 in which the second set of members comprises a plurality of jaw elements positioned substantially coaxially with the first set of members.

5. An apparatus according to claim 1 in which the end sizing element comprises an end part adapted to cooperate with an end part of the engagement section to form said at least one end portion.

6. An apparatus for forming a workpiece with an inner surface and an opposed outer surface into a housing of an antipollution device for treating exhaust in which at least one preselected catalyst-bearing brick is positionable, and in which at least one mat is positionable between said at least one brick and the housing to support said at least one brick, at least part of the inner surface defining an initial chamber in the workpiece with at least one initial dimension, the apparatus comprising:

a first set of members for engaging the inner surface;
a second set of members for engaging the outer surface;
a controller for receiving dimensional data for said at least one brick and said at least one mat and for determining at least one calculated dimension based on the dimensional data, said at least one calculated dimension at least partially defining a formed chamber in a main portion of the housing and said at least one calculated dimension being sized for compressing said at least one mat to a preselected density when said at least one brick is positioned in the formed chamber and said at least one mat is positioned between said at least one brick and the main portion of the housing;
the controller additionally controlling the second set of members for engaging the workpiece to change said at least one initial dimension to said at least one calculated dimension, such that said at least one mat is compressed to the preselected density when said at least one brick and said at least one mat are positioned in the formed chamber of the main portion of the housing;
the first set of members comprising an end part and a transition part adapted to cooperate with an engagement section of the second set of members to form a workpiece end part between the first and second sets of members into at least one end portion, and at least one transition portion connecting said at least one end portion with the main portion, said first and second sets of members being controlled by the controller such that said at least one end portion of the housing has at least one preselected dimension having a predetermined relation to said at least one calculated dimension;
the end sizing element of the first set of members comprising a transition part adapted to cooperate with a transition part of the engagement section of the second set of members to form said at least one transition portion therebetween; and
the first set of members additionally comprising an outer part with a surface thereof adapted to engage a preselected part of the outer surface of the main portion, to resist deformation of the main portion while said at least one end portion and said at least one transition portion are formed, the first set of members being controlled by the controller to position the surface of the outer part of the first set of members at least partially based on the dimensional data.

* * * * *

UNITED STATES PATENT AND TRADEMARK OFFICE
CERTIFICATE OF CORRECTION

PATENT NO.       : 8,701,288 B2                                     Page 1 of 1
APPLICATION NO.  : 12/741950
DATED            : April 22, 2014
INVENTOR(S)      : Sojak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this
Twenty-ninth Day of September, 2015

Michelle K. Lee
*Director of the United States Patent and Trademark Office*